(12) United States Patent
Kimura

(10) Patent No.: US 7,167,291 B2
(45) Date of Patent: Jan. 23, 2007

(54) OPTICAL SCANNING APPARATUS AND IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 11/056,285

(22) Filed: Feb. 14, 2005

(65) Prior Publication Data
US 2005/0185238 A1  Aug. 25, 2005

(30) Foreign Application Priority Data
Feb. 24, 2004 (JP) .............................. 2004-047906

(51) Int. Cl.
*G02B 26/08* (2006.01)
(52) U.S. Cl. ...................... 359/215; 347/134
(58) Field of Classification Search ................ 359/205, 359/215, 216; 347/134, 137
See application file for complete search history.

(56) References Cited

U.S. PATENT DOCUMENTS

| | | | |
|---|---|---|---|
| 5,757,535 A | 5/1998 | Ichikawa | 359/216 |
| 5,940,663 A | 8/1999 | Mizunuma et al. | 399/201 |
| 6,268,877 B1 | 7/2001 | Sato et al. | 347/241 |
| 6,927,883 B1 * | 8/2005 | Fujimoto | 359/205 |
| 2004/0263979 A1 | 12/2004 | Kimura | 359/566 |

FOREIGN PATENT DOCUMENTS

| | | |
|---|---|---|
| JP | 2001-59946 | 3/2001 |
| JP | 2002-267976 | 9/2002 |

* cited by examiner

*Primary Examiner*—Euncha P. Cherry
(74) *Attorney, Agent, or Firm*—Fitzpatrick, Cella, Harper & Scinto

(57) ABSTRACT

An optical scanning apparatus can satisfactorily correct a field curvature caused by spherical aberration in an incidence optical system. A light beam emitted from a light source is guided to an optical deflector for deflecting the light beam through a first optical system having a collimating operation, and a second optical system including a surface having a beam expanding operation and an aspherical operation for compensating for aberration in order. When the light beam deflected by the optical deflector is guided to a surface to be scanned through a third optical system, the light beam emitted from the light source is converted into a nearly collimated light beam through the first and second optical systems within a main scanning cross-section and is made incident on a deflecting surface of the optical deflector to make its width wider than that of the deflecting surface thereof in a main scanning direction. Thus, a surface of the second optical system having an aspherical operation compensates for a spherical aberration generated in the first optical system.

15 Claims, 12 Drawing Sheets

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same. In particular, the present invention is suitable for an image forming apparatus, which employs an electrophotographic process, such as a laser beam printer, a digital copying machine or a multi-function printer. In this case, in the image forming apparatus, after a light beam emitted from light source means is made incident on a deflecting surface of an optical deflector to be deflected so as to make its width wider than that of the deflecting surface in a main scanning direction, a surface to be scanned is scanned with the resultant light beam through a scanning optical system having fθ characteristic to record image information on the surface to be scanned.

2. Related Background Art

Heretofore, an optical scanning apparatus has been widely used in an image forming apparatus, which employs an electrophotographic process, such as a laser beam printer, a digital copying machine or a multi-function printer.

In this optical scanning apparatus, a light beam emitted from light source means constituted by a semiconductor laser or the like, for example, is converted into a nearly collimated light beam (or a convergent light beam or a divergent light beam) by a collimator lens to be guided to a deflecting surface (deflecting/reflecting surface) of an optical deflector including a polygon mirror (rotational polygon mirror). Thus, a surface to be scanned is scanned with the light beam deflected by the optical deflector at a constant speed while the light beam is imaged in a spot-like shape on the surface to be scanned using a scanning optical system (fθ lens system).

In addition, in this optical scanning apparatus, in a sub-scanning cross section (or cross-section) orthogonal to a main scanning cross section, there may be used in some cases a so-called optical face tangle error correction optical system with which a nearly collimated light beam emitted through a collimator lens is condensed in the vicinity of a deflecting surface of an optical deflector using a cylindrical lens having a predetermined refractive power only in a sub-scanning direction, and is then re-imaged on a surface to be scanned by a scanning optical system.

On the other hand, there is used an under filled scanning optical system (hereinafter also referred to as "UFS") in which the whole light beam is reflected/deflected by a deflecting surface in a state in which a width of a nearly collimated light beam emitted through a collimator lens is made narrower than that of the deflecting surface in a main scanning cross section. Though the UFS can deflect and scan the light most efficiently, the deflecting surface needs to be made large to some degree. As a result, the UFS has a tendency to scale up the optical deflector.

In recent years, for the laser beam printer, the digital copying machine or the multi-function printer, a demand for increasing the printing speed has increased. However, in order to increase the printing speed, it is necessary to rotate the optical deflector at a high speed or to increase the number of deflecting surfaces of the deflector. In the case of the UFS having the large optical deflector, if the optical deflector is rotated at a higher speed, there arises a problem concerning heat generation, noises or power consumption of the optical deflector. In addition, if the number of deflecting surfaces of the deflector is increased, the optical deflector is further scaled up. As a result, likewise, there arises a problem concerning heat generation, noises or power consumption of the optical deflector.

On the other hand, in case of an over field scanning optical system (hereinafter also referred to as "OFS") in which a light beam emitted from light source means is made incident on a deflecting surface of an optical deflector with its width wider than that of the deflecting surface in a main scanning direction, the optical deflector itself is smaller than that included in the UFS. As a result, the optical deflector can be rotated at a higher speed, and the number of reflecting surfaces can be increased.

In the OFS, a light beam is made incident on a deflecting surface of an optical deflector with its width wider than that of the deflecting surface in a main scanning direction, and a part of the light beam is cut away by the deflecting surface. Hence, there is encountered a problem that the higher output power is required for the light source means all the more because the utilization efficiency of the light energy is lower than that in the UFS. However, in recent years, a high-power semiconductor laser has been developed as the light source means, and hence this problem has been solved.

However, the above-mentioned OFS involves the following problems.

In the OFS, a light beam emitted from light source means is made incident on a deflecting surface of an optical deflector with its width wider than that of the deflecting surface of the optical deflector in a main scanning direction, and is then deflected so as to be cut away by the deflecting surface of the optical deflector to be guided to a surface to be scanned. Thus, different portions of the light beam made incident on the optical deflector are used in correspondence to an image height of the surface to be scanned. For example, for the light beam guided to a central portion on the surface to be scanned, a central portion of the light beam made incident on the optical deflector is used, while for the light beam guided to a peripheral portion of the surface to be scanned, a peripheral portion of the light beam made incident on the optical deflector is used. For this reason, when the light beam made incident on the optical deflector has a difference in wavefront between the central portion (the vicinity of an on-axis portion) and the peripheral portion of the light beam as typified by spherical aberration, for example, a so-called field curvature is caused in which a difference occurs in imaging positions on the surface to be scanned in correspondence to an image height.

A beam spot size is enlarged on the surface to be scanned in correspondence to the image height due to the field curvature. In addition, the OFS is more likely to cause a side lobe in a spot profile on the surface to be scanned due to the field curvature as compared with the UFS.

The problem such as the enlargement of the spot size, and the side lobe in the spot profile results in a negative effect such as reduction in the resolution and thickening a fine line on an image recorded on the surface to be scanned. Since this tendency becomes more remarkable as the beam spot diameter is small, it has been especially a serious problem in coping with the high image quality of an image forming apparatus.

Various optical scanning apparatuses each using the OFS with which the above-mentioned problems are solved have been proposed (refer to U.S. Pat. No. 5,757,535, Japanese Patent Application Laid-open No. 2001-59946, and Japanese Patent Application Laid-open No. 2002-267976, for example).

U.S. Pat. No. 5,757,535 discloses an optical scanning apparatus including: light source means; a first optical system for converting a light beam diverged in at least a main scanning direction from the light source means into a nearly collimated flux; a rotational polygon mirror having a plurality of deflecting surfaces (reflecting surfaces) parallel to a rotation axis, the rotational polygon mirror serving to rotate around the rotation axis at a nearly constant angular velocity to deflect/reflect an incident light beam along a predetermined main scanning direction by the plurality of deflecting surfaces; and a second optical system for converging the deflected/reflected light beam onto a surface to be scanned so that the surface to be scanned is scanned with the light beam deflected/reflected by the rotational polygon mirror along a main scanning direction at a nearly constant speed, in which the optical scanning apparatus is of an over field type in which the light beam from the light source means is made incident on the plurality of deflecting surfaces of the rotational polygon mirror so as the light beam to straddle the plurality of deflecting surfaces thereof, and a wavefront for correcting aberration generated in the second optical system to which a part of the light beam deflected/reflected by one deflecting surface of the rotational polygon mirror is made incident is formed by the first optical system on which the whole light beam from the light source means is made incident. That is, U.S. Pat. No. 5,757,535 discloses that the spherical aberration generated in the first optical system as an incidence optical system from the light source means to the optical deflector and the field curvature caused in the second optical system as a scanning optical system from the optical deflector to the surface to be scanned are made cancel each other.

Japanese Patent Application Laid-open No. 2001-59946 discloses an optical scanning apparatus including: a first optical system having light source means for converting a light beam emitted from the light source means into a nearly collimated light beam in a main scanning cross section; a second optical system including the first optical system for allowing the light beam made incident on a deflecting surface of an optical deflector with its width wider than that of the deflecting surface in a main scanning direction; and a third optical system for imaging the light beam deflected/reflected by the optical deflector on a surface to be scanned, in which the first optical system includes an achromatic lens having a negative lens and a positive lens, or a single lens having at least one aspherical surface thereof. That is, the first optical system as a condenser lens (unit) for condensing the light beam from the light source means adopts two lenses, i.e., a concave lens and a convex lens, or an aspherical lens, thereby suppressing generation of the spherical aberration itself in the first optical system.

Japanese Patent Application Laid-open No. 2002-267976 discloses that at least one resin lens and a glass lens are provided between a coupling lens and an optical deflector, and a shape of the resin lens within a main scanning cross section is made non-arcuate (aspherical surface), thereby correcting the spherical aberration.

However, in U.S. Pat. No. 5,757,535, since the first optical system (incidence optical system) and the second optical system (scanning optical system) are designed so as to be paired with each other, in a case where when the first and second optical systems are diverted to another imaging apparatus, the specification, e.g., the scanning speed, is different from original one, if the first optical system is redesigned, the second optical system also needs to be redesigned accordingly.

In Japanese Patent Application Laid-open No. 2001-59946 in which that point is improved, since two condenser lenses are used or the aspherical lens is used, this configuration is likely to involve a disadvantage in terms of the cost.

In particular, when the optical stability against the heat is taken into consideration, the resin lens is hard to be used as the condenser lens disposed in the vicinity of the laser light source as a heat source. Thus, since the condenser lens is necessarily made of glass, the cost-up due to an increase in the number of lenses or utilization of the aspherical surface cannot be disregarded.

Japanese Patent Application Laid-open No. 2002-267976 discloses that at least one resin lens and the glass lens are provided between the coupling lens and the optical deflector, and the shape of the resin lens within a main scanning cross section is made non-arcuate (aspherical surface), thereby correcting the spherical aberration. However, a method of solving the problem that the spherical aberration which is generated in the incidence optical system and which is inherent in the OFS causes the field curvature in the optical scanning apparatus is not described at all.

SUMMARY OF THE INVENTION

It is an object of the present invention to provide an optical scanning apparatus which is capable of satisfactorily correcting a field curvature caused by aspherical aberration generated in an incidence optical system, and an image forming apparatus using the same.

According to one aspect of the invention, an optical scanning apparatus includes: light source means; a first optical system for converting a divergent light beam emitted from the light source means; a second optical system for guiding the light beam obtained through the conversion in the first optical system to an optical deflector; and a third optical system for guiding the light beam deflected by the optical deflector to a surface to be scanned. In the optical scanning apparatus, the first optical system and the second optical system convert the light beam emitted from the light source means into a collimated light beam or a nearly collimated light beam within a main scanning cross section to make the resultant light beam incident on a deflecting surface of the optical deflector with a width of the resultant light beam wider than that of the deflecting surface in a main scanning direction, and an optical surface which is included within the second optical system and which has an aspherical operation within the main scanning cross section compensates for spherical aberration generated in the first optical system.

According to another aspect of the invention, an optical scanning apparatus includes: light source means; a first optical system for converting a divergent light beam-emitted from the light source means; a second optical system for guiding a light beam obtained through the conversion in the first optical system to an optical deflector; and a third optical system for guiding a light beam deflected by the optical deflector to a surface to be scanned. In the optical scanning apparatus, at least a part of the second optical system includes the third optical system, the first optical system and the second optical system convert the light beam emitted from the light source means into a collimated light beam or a nearly collimated light beam within a main scanning cross section to make the resultant light beam incident on a deflecting surface of the optical deflector with a width of the resultant light beam wider than that of the deflecting surface in a main scanning direction, an optical axis of the second optical system and an optical axis of the third optical system are coincident with each other within the main scanning cross section, the first optical system and the second optical system make the light beam emitted from the light source means incident at a predetermined angle with respect to a normal to the deflecting surface of the optical deflector within a sub-scanning cross section, and an optical surface which is included within the second optical system and which has an aspherical operation within the main scanning cross section compensates for spherical aberration generated in the first optical system.

According to a further aspect of the invention in the optical scanning apparatus, an angle between an optical axis of the second optical system and an optical axis of the third optical system within the main scanning cross section is a predetermined angle.

According to a further aspect of the invention in the optical scanning apparatus, the first optical system has a single spherical lens.

According to a further aspect of the invention in the optical scanning apparatus, the optical surface which is included in the second optical system and which has the aspherical operation within the main scanning cross section compensates for a field curvature on the surface to be scanned in the main scanning direction due to spherical aberration generated in the first optical system.

According to a further aspect of the invention in the optical scanning apparatus, the optical surface which is included in the second optical system and which has the aspherical operation within the main scanning cross section has a non-arcuate shape.

According to a further aspect of the invention in the optical scanning apparatus, the optical surface which is included in the second optical system and which has the aspherical operation within the main scanning cross section is a diffracting surface.

According to a further aspect of the invention in the optical scanning apparatus, the diffracting surface compensates for chromatic aberration, in the whole system including the first optical system, the second optical system, and the third optical system, which is generated when a wavelength of the light beam emitted from the light source means fluctuates and/or chromatic aberration which is generated in the whole system including the first optical system, the second optical system, and the third optical system.

According to a further aspect of the invention in the optical scanning apparatus, a reflecting member is provided between the light source means and the optical deflector, and the light beam to be made incident on the optical deflector is made incident on the optical deflector through the reflecting member, and is also made incident at a predetermined angle with respect to the normal to the deflecting surface of the optical deflector within the sub-scanning cross section.

According to a further aspect of the invention in the optical scanning apparatus, the light beam made incident on the optical deflector through the first optical system and the second optical system exists within the same plane where the light beam with which the surface to be scanned is scanned by the third optical system exists.

According to a further aspect of the invention in the optical scanning apparatus, the first optical system includes a lens made of a glass material, and the second optical system includes at least one lens made of a resin, and the following conditional expression is satisfied, $$3.0 \times |SA| \times (F_3/F_{12})^2 \leq 1.55 \times 10^3 \times (F_3/W \times \lambda)^2,$$

where SA represents maximum spherical aberration generated in the first optical system and the second optical system, $F_{12}$ represents a composite focal length of the first optical system and the second optical system in the main scanning direction, $F_3$ represents a focal length of the third optical system in the main scanning direction, $\lambda$ represents a wavelength of the light beam emitted from the light source means, and W represents a width of the deflecting surface of the optical deflector in the main scanning direction.

According to another aspect of the invention, an image forming apparatus includes: the optical scanning apparatus set out in the foregoing; a photosensitive member disposed on the surface to be scanned; a developing device for developing, as a toner image, an electrostatic latent image formed on the photosensitive member using a light beam with which the optical scanning apparatus scans; a transferring device for transferring the toner image obtained through the developing process onto a material to be transferred; and a fixing device for fixing the transferred toner image to the material to be transferred.

According to another aspect of the invention, an image forming apparatus includes: the optical scanning apparatus set out in the foregoing; and a printer controller for converting code data inputted thereto from an external device into an image signal to input the image signal to the optical scanning apparatus.

According to another aspect of the invention, a color image forming apparatus includes a plurality of image bearing members for forming images having colors different from each other, each of the plurality of image bearing members being disposed on the surface to be scanned of the optical scanning apparatus set out in the foregoing.

According to a further aspect of the invention, the color image forming apparatus further includes a printer controller for converting color signals inputted thereto from an external device into image data corresponding to the different colors, respectively, to input the resultant image data to the optical scanning apparatuses, respectively.

According to the present invention, it is possible to realize the optical scanning apparatus which is capable of satisfactorily correcting a field curvature by compensating for spherical aberration generated in the first optical system in correspondence to an image height on the surface to be scanned using the surface having the aspherical operation of the second optical system, and the image forming apparatus using the same. In addition, according to the present invention, it is possible to realize the optical scanning apparatus which is capable of showing an excellent imaging performance by reducing such disadvantages that an irradiation position on a photosensitive drum varies during manufacture of the optical scanning apparatus or during use of the optical scanning apparatus, aberration abruptly gets worse to degrade an imaging state of a spot, and so forth, and the image forming apparatus using the same.

DESCRIPTION OF THE PREFERRED EMBODIMENTS

Preferred embodiments of the present invention will hereinafter be described in detail with reference to the accompanying drawings.

Embodiment 1

Figure 1:
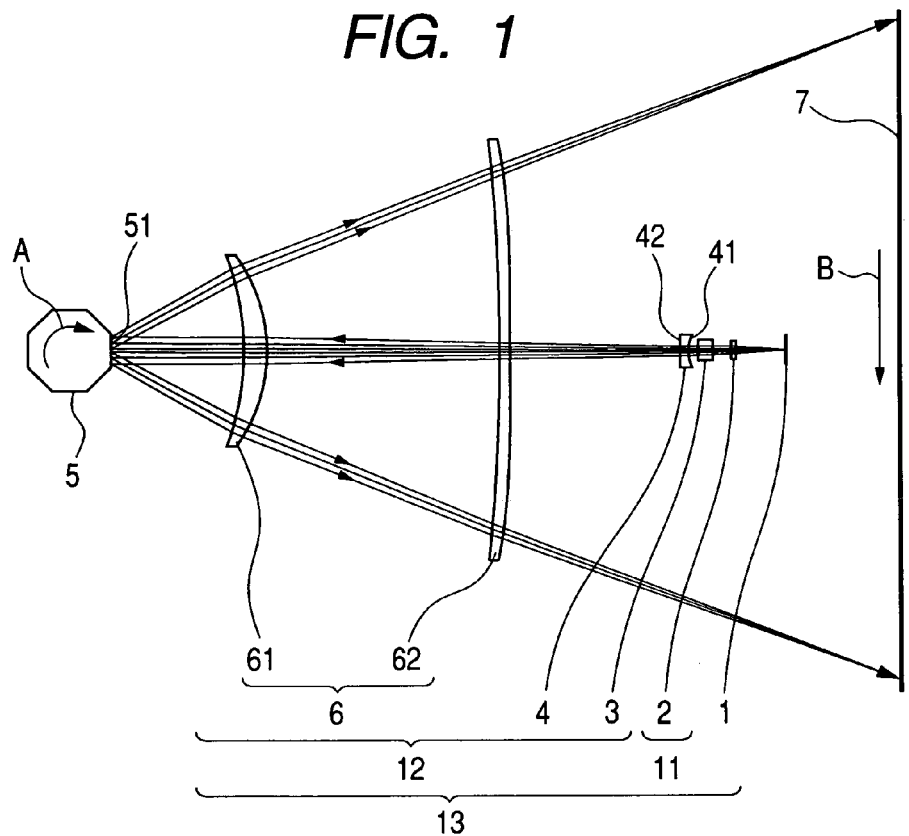
FIG. 1 is a main scanning cross sectional view of Embodiment 1 of the present invention.
Figure 2:
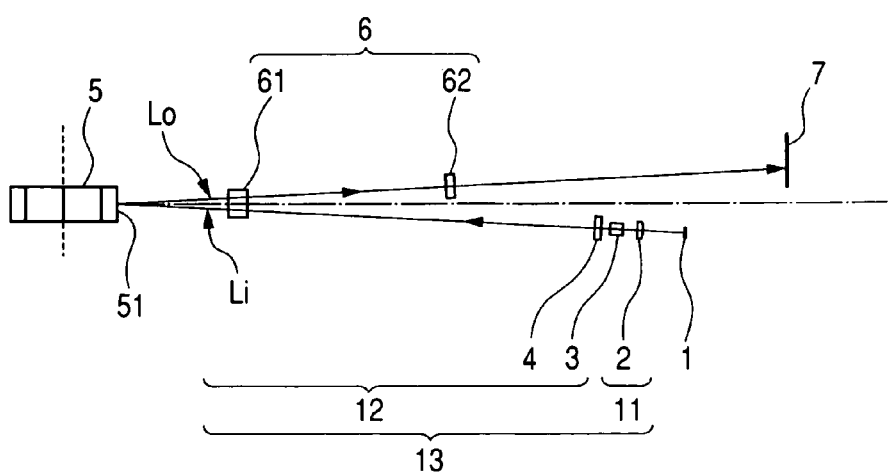
FIG. 2 is a sub-scanning cross sectional view of Embodiment 1 of the present invention.

FIG. 1 is a cross sectional view of a main portion in a main scanning direction (main scanning cross sectional view) in Embodiment 1 of the present invention, and FIG. 2 is a cross sectional view of a main portion in a sub-scanning direction (sub-scanning cross sectional view) in FIG. 1.

Here, the main scanning direction represents a direction perpendicular to a rotation axis of deflection means and an optical axis of an imaging optical system (a direction within which a light beam is reflected/deflected (deflected/scanned) by the deflection means), and the sub-scanning direction represents a direction parallel to the rotation axis of the deflection means. In addition, the main scanning cross section represents a plane which is parallel to the main scanning direction and contains the optical axis of the imaging optical system. Also, the sub-scanning cross section represents a cross section perpendicular to the main scanning cross section.

In FIGS. 1 and 2, reference numeral 1 designates light source means which includes a semiconductor laser.

Reference numeral 11 designates a first optical system having a collimating operation. The first optical system 11 includes a condenser lens (collimator lens) having a lens made of a glass material. The condenser lens 2 in Embodiment 1 has a single spherical lens and serves to convert a light beam emitted from the light source means 1 into a nearly divergent light beam (or a nearly collimated light beam or a nearly convergent light beam).

Reference numeral 12 designates a second optical system having a beam expander operation for expanding an aperture of the light beam emitted through the first optical-system 11 and an aspherical surface for compensating for aberration. The second optical system 12 includes a cylindrical lens (lens system) 3, a correcting lens 4 as a correction element, and a first imaging lens 61 constituting a part of a third optical system 6 which will be described later.

Reference numeral 13 designates an incidence optical system including the first and second optical systems 11 and 12.

The above-mentioned cylindrical lens (cylinder lens) 3 has a predetermined optical power only within the sub-scanning cross section, and serves to image the light beam passed through the condenser lens 2 in the form of a line image which is long nearly in the main scanning direction on a deflecting surface (deflecting/reflecting surface) 51 of a polygon mirror 5 as will be described later within the sub-scanning cross section.

The above-mentioned correcting lens 4 includes a lens made of resin, and has refractive powers within the main scanning cross section and the sub-scanning cross section which are different from each other. Also, the correcting lens 4 has an incidence surface 41 which is anamorphic aspherical and non-arcuate in main scanning cross section, and has a diffraction grating on its emission surface 42. The optical power of the second optical system 12 having the correcting lens 4 within the main scanning cross section is set so as to be weaker than that within the sub-scanning cross section. Note that the diffraction grating may also be formed on the incidence surface 41 or on both the surfaces in addition to the emission surface 42. Also, the diffraction grating may also be given an aspherical surface effect.

Reference numeral 5 designates an optical deflector as deflection means which includes the polygon mirror (rotational polygon mirror). The optical deflector 5 is rotated at a constant speed in a direction indicated by an arrow A shown in FIG. 1 by drive means (not shown) such as a motor.

Reference numeral 6 designates an imaging optical system (fθ lens system) as a third optical system having a condenser function and fθ characteristic. The imaging optical system 6 has two lenses, a first imaging lens 61 and a second imaging lens 62, and serves to image the light beam based on image information and deflected/reflected by the polygon mirror 5 on a surface 7 of a photosensitive drum as a surface to be scanned within the main scanning cross section, and to provide a nearly optically conjugate relationship between the deflecting surface 51 of the polygon mirror 5 and the surface of the photosensitive drum 7 within the sub-scanning cross section. Thereby, the imaging optical system 6 has an optical face tangle error correction function.

The first imaging lens 61 in Embodiment 1 is configured so as to have a refractive power in the main scanning direction within the same sub-scanning cross section. Thus, the first imaging lens 61 configures a so-called double path to which both an incident light beam Li emitted from the light source means 1 and a deflected light beam Lo deflected/scanned by the deflecting surface 51 are made incident.

In Embodiment 1, the light beam emitted from the light source means 1 is converted into a nearly divergent light beam by the condenser lens 2 and the nearly divergent light beam is then converted into a convergent light beam within the sub-scanning cross section by the cylindrical lens 3, the correcting lens 4, and the first imaging lens 61 to be made obliquely incident on the deflecting surface 51 of the polygon mirror 5 at a predetermined angle (θ=3°) with respect to a normal to the deflecting surface 51 to be imaged nearly in the form of a line image (a longitudinal line image in the main scanning direction) in the vicinity of the deflection surface 51 (oblique incidence optical system).

On the other hand, the nearly divergent light beam from the condenser lens 2 is converted into a nearly collimated light beam within the main scanning cross section by the correcting lens 4 and the first imaging lens 61 to be made incident to a center of a deflection angle of the polygon mirror 5, or to a nearly central portion thereof (front face incidence). A width of the nearly collimated light beam at this time is set so as to be much wider than a facet width of the deflection surface 51 of the optical deflector 5 in the main scanning direction (OFS).

Then, the light beam which has been deflected/reflected by the deflecting surface 51 of the optical deflector 5 is guided to the surface 7 of the photosensitive drum through the first and second imaging lenses 61 and 62. Then, the surface 7 of the photosensitive drum is optically scanned in a direction indicated by an arrow B (main scanning direction) with the light beam by rotating the optical deflector 5 in the direction indicated by the arrow A. As a result, an image is recorded on the surface 7 of the photosensitive drum serving as a recording medium.

Assuming that the origin be an intersection of the aspherical surface, which is expressed by a function having terms of up to the tenth order in the main scanning direction, and the optical axis, an x-axis be the optical axis direction, a y-axis be orthogonal to the optical axis within the main scanning surface, and a z-axis be orthogonal to the optical axis within the sub-scanning surface, lens surface shape (toric shape) is defined by the following equations. In terms of the meridian line direction, it is expressed by the following equation, $$x = \frac{Y^2/R}{1 + (1-(1+K)(Y/R)^2)^{\frac{1}{2}}} + B_4Y^4 + B_6Y^6 + B_6Y^8 + B_{10}Y^{10} \quad (A1)$$

where R represents a radius of curvature, and K, $B_4$, $B_6$, $B_8$ and $B_{10}$ are aspherical surface coefficients. And in terms of the sagittal line direction corresponding to the sub-scanning direction including the optical axis and orthogonal to the main scanning direction, it is expressed by the following equation, $$S = \frac{Z^2/r'}{1 + (1-(Z/r')^2)^{\frac{1}{2}}} \quad (A2)$$

where $r' = r_0(1 + D_2Y^2 + D_4Y^4 + D_6Y^6 + D_8Y^8 + D_{10}Y^{10})$ in which $r_0$ represents a radius of curvature of the sagittal line on the optical axis, and $D_2$, $D_4$, $D_6$, $D_8$ and $D_{10}$ are coefficients. As for the diffraction grating, a diffracting surface which is expressed by a phase function having terms of up to the tenth order in the main scanning direction, and is also expressed by a phase function of the second order differing depending on positions along the main scanning direction in the sub-scanning direction. The phase function is expressed as follows, $$\varphi = m\lambda$$
$$= b_2Y^2 + b_4Y^4 + b_6Y^6 + b_8Y^8 +$$
$$b_{10}Y^{10} + (d_0 + d_1Y + d_2Y^2 + D_3Y^3 + d_4Y^4)Z^2$$

where m represents an order of diffraction in which a +1-th diffracted light is used. Respective values of the optical scanning apparatus in Embodiment 1 are shown in Tables 1 and 2.

TABLE 1

Oblique Incidence Angle within Sub-scanning Cross Section θ = 3°

|  | Surface | R | D | N |
|---|---|---|---|---|
| Light Source 1 | 1 |  | 25.61 | 1.000 |
| Condenser Lens 2 | 2 | ∞ | 2.00 | 1.762 |
|  | 3 | −23.39 | 8.70 | 1.000 |
| Cylindrical Lens 3 | 4 | Table 2 | 7.00 | 1.511 |
|  | 5 | ∞ | 5.00 | 1.000 |
| Correction Element 4 | 6 | Table 2 | 4.00 | 1.524 |
|  | 7 | ∞ | 203.30 | 1.000 |
| Imaging Lens 61 | 8 | Inversion Shape of Surface 12 | 11.00 | 1.524 |
|  | 9 | Inversion Shape of Surface 11 | 63.90 | 1.000 |
| Deflecting/Reflecting Surface 51 | 10 | ∞ | 63.90 | 1.000 |
| Imaging Lens 61 | 11 | Table 2 | 11.00 | 1.524 |
|  | 12 | Table 2 | 115.30 | 1.000 |
| Imaging Lens 62 | 13 | Table 2 | 5.00 | 1.524 |
|  | 14 | Table 2 | 191.90 | 1.000 |
| Surface to be scanned 7 | 15 | ∞ |  |  |

TABLE 2

Aspherical Surface Shape

|  |  | Surface 4 | Surface 6 | Surface 11 | Surface 12 | Surface 13 | Surface 14 |
|---|---|---|---|---|---|---|---|
| Meridian Line Shape | R | ∞ | −1.77E+01 | −1.38E+02 | −7.38E+01 | −9.46E+02 | −5.97E+03 |
|  | K | 0 | 0 | 7.80E−01 | −6.38E−01 | 0 | −3.37E+04 |
|  | B4 | 0 | −5.00E−05 | 3.10E−07 | 1.40E−07 | 0 | −7.50E−08 |
|  | B6 | 0 | 0 | −1.10E−10 | −3.33E−11 | 0 | 3.37E−12 |
|  | B8 | 0 | 0 | 1.53E−15 | −2.26E−14 | 0 | −1.06E−16 |
| Sagittal line shape | R | 4.46E+01 | −1.02E+02 | −1.00E+03 | −1.00E+03 | 2.20E+03 | −6.49E+01 |
|  | d2 | 0 | 0 | 0 | 0 | 0 | 2.42E−05 |
|  | d4 | 0 | 0 | 0 | 0 | 0 | −1.12E−09 |
|  | d6 | 0 | 0 | 0 | 0 | 0 | 5.28E−14 |
|  | d8 | 0 | 0 | 0 | 0 | 0 | −4.30E−19 |

Diffraction Grating Phase Function Constant

Surface 7  $d_0$  −7.93E−04
         $b_2$  −1.02E−02

$d_1, d_2, d_3, d_4 = 0$   $b_4, b_6, b_8, b_{10} = 0$ $F_1 = 30.7$
$F_{3P} = -130.88$
$F_{12} = 99.50$
$F_2 = 754.73$
$F_3 = 313.39$
$\lambda = 0.00079$ The optical deflector 5 in Embodiment 1 is the polygon mirror having eight surfaces which touch internally to a circle of radius 18.6 mm, and a width of the deflecting surface 51 in the main scanning direction is 7.12 mm. In the case of the OFS, the width of the deflecting surface 51 performs a function of a stop in the main scanning direction. While not clearly demonstrated, if a stop in the sub-scanning direction is provided in the optical path between the light source means 1 and the optical deflector 5, the stop is easy to construct.

In addition, the optical deflector 5 deflects the incident light beam which has been made incident thereon with its width wider than that of the deflecting surface 51 in the main scanning direction so as to cut away a part of the incident light beam by the deflecting surface 51 to guide the resultant light beam to the fθ lens system 6. Thus, different portions of the light beam made incident on the optical deflector 5 are used depending on image heights on the surface 7 to be scanned. For example, for the light beam guided to a central portion on the surface 7 to be scanned, a central portion of the light beam made incident on the optical deflector 5 is used, while for the light beam guided to a peripheral portion thereof, a peripheral portion of the light beam made incident on the optical deflector 5 is used.

In Embodiment 1, as shown in Tables 1 and 2, the first imaging lens 61 having a optical power mainly in the main scanning direction has an aspherical surface shape which is expressed by the function of Equation (A1). While the first imaging lens 61 has nearly no optical power in the sub-scanning direction, the present invention is not intended to be limited thereto. For example, the first imaging lens 61 may have a cylinder shape with both sides being flat in the sub-scanning direction. In this case, the first imaging lens 61 mainly takes charge of the imaging and the constant speed scanning in the main scanning direction for the light beam made incident thereon.

On the other hand, the second imaging lens 62 is an anamorphic lens having the optical power mainly in the sub-scanning direction. The second imaging lens 62 is also an aspherical lens, and its lens surface shape is an aspherical surface expressed by the function of Equation (A2). The second imaging lens 62 has nearly no optical power in the main scanning direction. The second imaging lens 62 mainly takes charge of the imaging in the sub-scanning direction and some correction for the spherical aberration in the main scanning direction for the light beam made incident thereon.

Note that the fθ lens system 6 is not necessarily limited to the optical power disposition, the number of lenses used, and the glass material characteristics as shown in Tables 1 and 2. That is, the fθ lens system 6 may adopt a conventional construction which has one or three or more lenses, different optical power disposition, another function expressing equation, a known glass material, or the like.

Next, an optical operation of the correction element 4 will be described.

As described above, the correcting lens 4 in Embodiment 1 converts the nearly divergent light beam from the condenser lens 2 into the nearly collimated light beam within the main scanning cross section to make the resultant light beam incident on the defecting surface 51 of the optical deflector 5 so as to make its width wider than that of one defecting surface 51 of the optical deflector 5 in the main scanning direction in conjunction with the first imaging lens 61.

In addition, the incidence surface 41 of the correcting lens 4, as shown in Tables 1 and 2, has an anamorphic aspherical surface shape having the optical powers different from each other in the main scanning cross section and in the sub-scanning cross section. This aspherical shape is determined so as to have the characteristics to compensate for or reduce the spherical aberration generated in the condenser lens 2. As a result, in Embodiment 1, the aspherical surface of the correcting lens 4 within the second optical system 12 compensates for the spherical aberration generated in the condenser lens 2 (first optical system) in correspondence to the image height on the surface 7 to be scanned. Note that the correcting lens 4 compensates for the field curvature on the surface 7 to be scanned due to the spherical aberration generated in the condenser lens 2.

In addition, the emission surface 42 of the correcting lens 4, as shown in Tables 1 and 2, forms a diffraction grating on the flat base surface. This diffraction grating is determined so as to mainly compensate for chromatic aberration which is generated through the whole optical system when a wavelength of the light beam emitted from the light source means fluctuates due to a temperature rise, for example, and/or a focus fluctuation (chromatic aberration) which is generated through all the first, second and third optical systems due to a temperature rise, for example.

In Embodiment 1, the aspherical surface shape of the incidence surface 41 has an optical operation for mainly compensating for the spherical aberration which is generated in the condenser lens 2. The diffraction grating of the emission surface 42 has an optical operation for mainly compensating for the focus fluctuation (chromatic aberration) which is generated when the temperature rises.

Next, the optical operation of the correction element 4 for compensating for the spherical aberration generated in the condenser lens 2 will be described with reference to FIG. 3.

Figure 3:
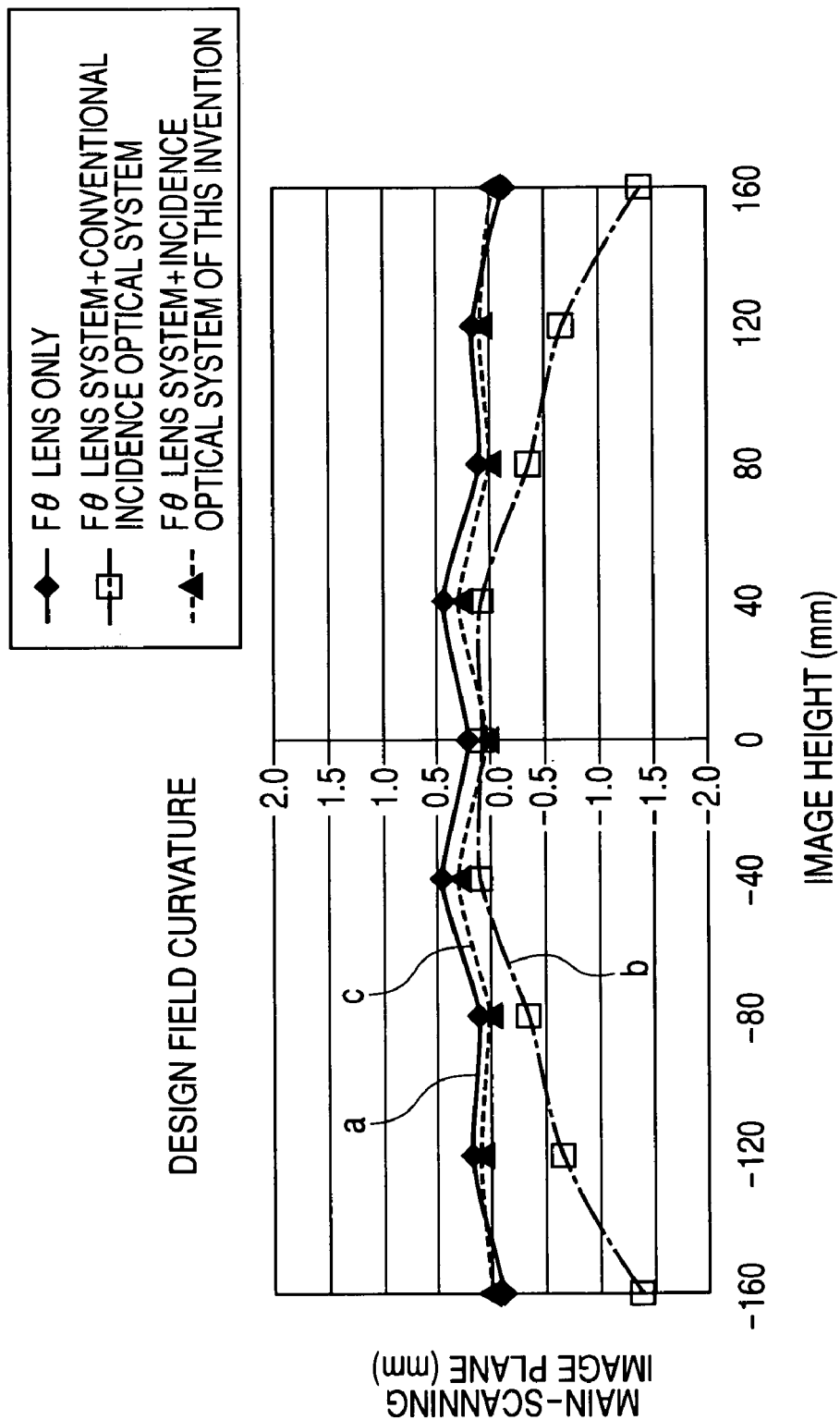
FIG. 3 shows a field curvature in Embodiment 1 of the present invention.

In FIG. 3, image heights on the surface 7 to be scanned is plotted on the axis of abscissa, and image planes in the main scanning direction is plotted on the axis of ordinate. In FIG. 3, of three field curvatures a, b, and c, the field curvature a is a field curvature caused through the fθ lens system 6 including the first and second imaging lenses 61 and 62 in FIG. 1. The field curvature b is a field curvature which is caused when the fθ lens system 6 is docked with the conventional incidence optical system. Also, the field curvature c is a field curvature which is caused when the fθ lens system 6 is docked with the incidence optical system 13 of Embodiment 1, i.e., a field curvature in a numerical example shown in Tables 1 and 2.

Note that the conventional incidence optical system is an optical system which is obtained by removing the correcting lens 4 from the incidence optical system 13 of Embodiment 1 shown in FIG. 1. Thus, the conventional incidence optical system includes the light source means 1, the condenser lens 2, the cylindrical lens 3, and the first imaging lens 61. Also, the conventional incidence optical system serves to make the light beam incident on the optical deflector 5 with its width wider than that of one deflecting surface 51 of the optical deflector 5 in the main scanning direction within the main scanning cross section, and serves to make the light beam incident on the optical deflector 5 so as to form its image in the vicinity of the deflecting surface 51 within the sub-scanning cross section.

When such a conventional incidence optical system is used for the satisfactorily corrected field curvature a of the fθ lens system, the whole optical system suffers an influence of the spherical aberration generated in the condenser lens 2. As a result, the field curvature depending on the image height is largely caused mainly in the off axis image height, and hence the optical imaging performance on the surface 7 to be scanned is deteriorated.

On the other hand, the field curvature c showing the optical performance inherent in Embodiment 1 is equal to the field curvature in the fθ lens system 6. That is, the aspherical surface of the correcting lens 4 in the second optical system 12 compensates for the aberration generated in the condenser lens 2 (first optical system) in correspondence to the image height on the surface 7 to be scanned.

Next, the optical operation of the correcting lens 4 for compensating for the focus fluctuation (chromatic aberration) when temperature rises will be described with reference to FIG. 4.

Figure 4:
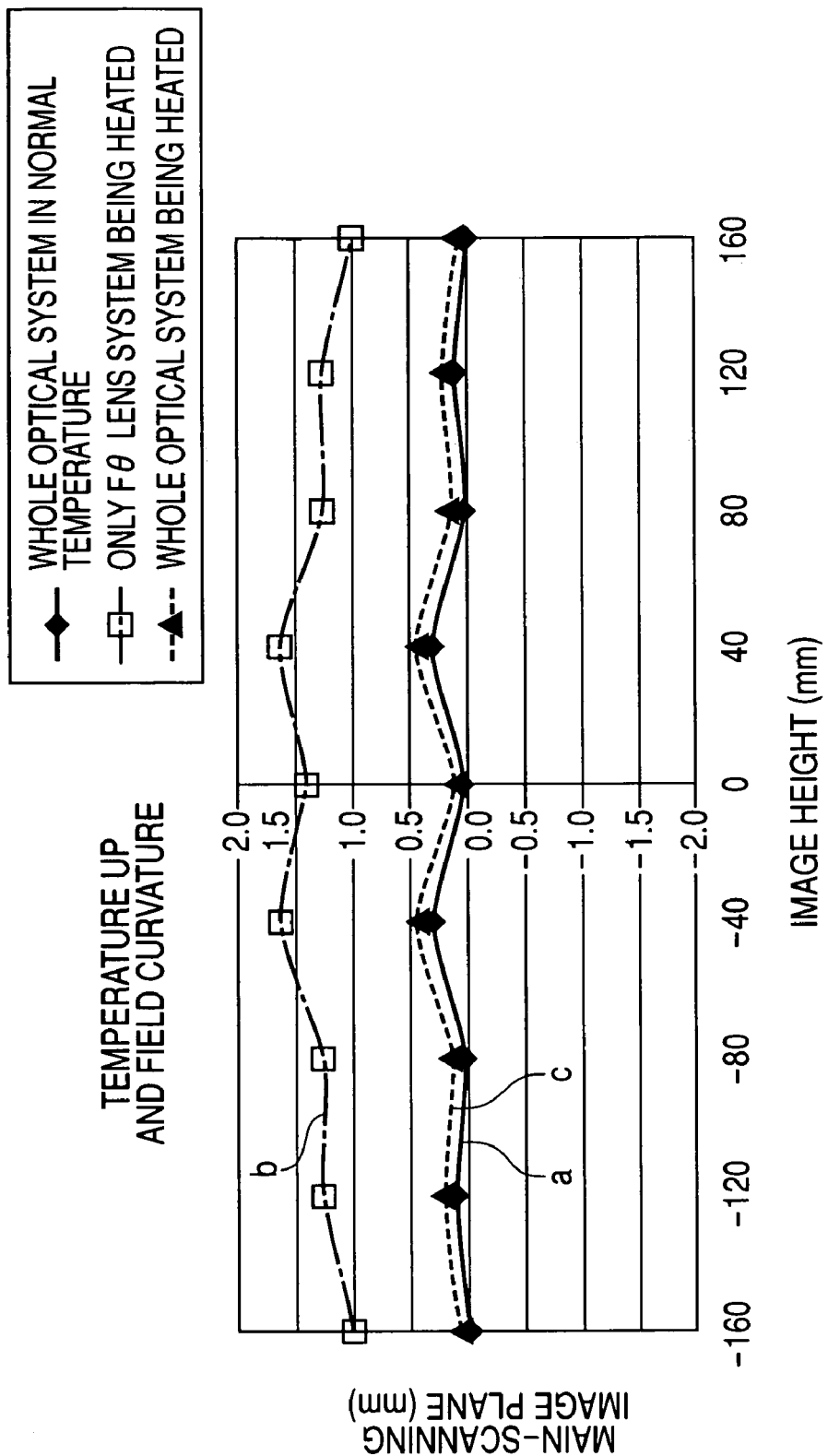
FIG. 4 shows a field curvature during a temperature rise in Embodiment 1 of the present invention.

In FIG. 4, image heights on the surface 7 to be scanned are plotted on the axis of abscissa, and image planes in the main scanning direction is plotted on the axis of ordinate. In FIG. 4, of three field curvatures a, b, and c, the field curvature a is a field curvature caused, in normal temperature, by the light source means 1, the condenser lens 2, the cylindrical lens 3, the correcting lens 4, and the fθ lens system 6 in FIG. 1. The field curvature b is a field curvature when temperature of the fθ lens system 6 rises by 25° C. Also, the field curvature c is a field curvature when not only temperature of the fθ lens system 6, but also temperature of all the light source means 1, the condenser lens 2, the cylindrical lens 3, the correcting lens 4, and the fθ lens system 6 in FIG. 1 rises by 25° C.

When temperature of the optical scanning apparatus fluctuates in Embodiment 1, the focus fluctuation is caused due to the refractive index fluctuation and the shape change of each of the optical elements, and the laser wavelength change and the refractive index fluctuation of each of the optical elements owing to the laser wavelength change, and thus the field curvature fluctuates. Such a focus fluctuation is interpreted as chromatic aberration in a wide sense.

It is understood from those three field curvatures a, b, and c that the focus fluctuation due to temperature rise in the optical scanning apparatus of Embodiment 1 is caused as a result that the focus fluctuation generated in the fθ lens system 6 due to the temperature rise and the focus fluctuation generated in the incidence optical system 13 including the first and second optical systems 11 and 12 due to the temperature rise cancel each other. In particular, the diffraction grating surface of the correcting lens 4 largely contributes to the focus fluctuation generated in the incidence optical system 13. The optical power fluctuation in the diffraction grating surface of the correcting lens 4 which is generated when the wavelength fluctuation is caused in the light source means 1 by the temperature rise is optimized, thereby compensating for the chromatic aberration (focus fluctuation) in the whole optical scanning apparatus.

In Embodiment 1, as described above, the first optical system 11 has the lens made of glass material, and the second optical system 12 has the lens made of resin. Then, letting SA be maximum spherical aberration due to the first and second optical systems 11 and 12, $F_{12}$ be a composite focal length of the first and second optical systems 11 and 12 in the main scanning direction, $F_3$ be a focal length of the third optical system (fθ lens system) 6 in the main scanning direction, λ be a wavelength of the light beam emitted from the light source means 1, and W be a facet width of the optical deflector 5, the following condition is satisfied $$3.0 \times |SA| \times (F_3/F_{12})^2 \leq 1.55 \times 10^3 \times (F_3/W \times \lambda)^2 \quad (1)$$

Next, a technical meaning of a conditional expression (1) will be described.

A right side of the conditional expression (1) represents a tolerance for an amount of field curvature in the optical scanning apparatus. Unlike the UFS in which a pupil shape is an arcuate or elliptical shape, the pupil shape in the OFS is generally a rectangular shape. A minimum value, $S_m$, of a spot diameter of the light beam, in the main scanning direction, forming a spot on the surface 7 to be scanned at this time is expressed as follows:

$$S_m = k \times F_{no} \times \lambda,$$

where k represents a constant, $F_{no}$ represents an F number of the light beam forming the spot on the surface 7 to be scanned, and λ represents a wavelength. When the pupil shape is the ellipse, k is about 1.65. When the pupil shape is the rectangular shape, k is about 1.42. In addition, $F_{no}$ is expressed as follows using the Fθ coefficient $F_3$ of this device, and the width (the facet width W) of one deflecting surface of the polygon mirror 5 in the main scanning direction:

$$F_{no} = F_3/W$$

The spot diameter in the main scanning direction increases from its minimum value, $S_m$, depending on defocus caused by a backward/forward movement (a positional change in the optical axis direction) of the surface 7 to be scanned. In general, a predetermined depth width is defined by a defocus range meeting the spot diameter which is 1.2 times as large as that of the minimum spot diameter, $S_m$. Letting $W_m$ be the predetermined depth width, $W_m$ is empirically expressed as follows:

$$W_m \approx (1.2 \times S_m)^2 \times 1.6 \times 10^3$$

When a tolerance, $W_a$, of an amount of field curvature in the optical scanning apparatus is expressed by $W_a = W_m/3$, the following equation is obtained by substituting the above-mentioned approximate equation for this equation:

$$W_a = W_m/3 \leq (1.2 \times S_m)^2 \times 1.6 \times 10^3 / 3 = 1.55 \times 10^3 (F_3/W \times \lambda)^2$$

This final equation corresponds to the right side of the conditional expression (1), and represents the allowable depth. By substituting the specifications in Table 1 for the above final equation, the right side, $W_a$, (allowable value) of the conditional expression (1) becomes $W_a = 1.79$.

Moreover, when the allowable value, $W_a$, for an amount of field curvature in the optical scanning apparatus is strictly assigned $W_a' = Wm/6$, the following equation is obtained:

$$W_a' = 0.78 \times 10^3 (F_3/W \times \lambda)^2$$

By substituting values in 1 into the above equation, $W_a' = 0.94$ is obtained.

A left side of the conditional expression (1) represents an approximate value of an amount of field curvature, on the surface 7 to be scanned, which is caused by the spherical aberration in the optical system from the light source means 1 to the optical deflector 5. Reference symbol SA represents an amount of spherical aberration obtained through a so-called inversion trace evaluation in which the nearly collimated light beam is made incident on an optical system including from the light source means 1 to the optical deflector 5, from the optical deflector 5 side to thereby evaluate the spherical aberration on a light source equivalent surface.

In addition, $(F_3/F_{12})^2$ in the left side of the conditional expression (1) represents longitudinal magnification of the whole scanning optical system in the main scanning direction. Thus, the maximum spherical aberration, SA, is multiplied by the longitudinal magnification of the whole scanning optical system, $(F_3/F_{12})^2$, thereby showing an amount of maximum field curvature on the surface 7 to be scanned which is caused by the spherical aberration.

Figure 5:
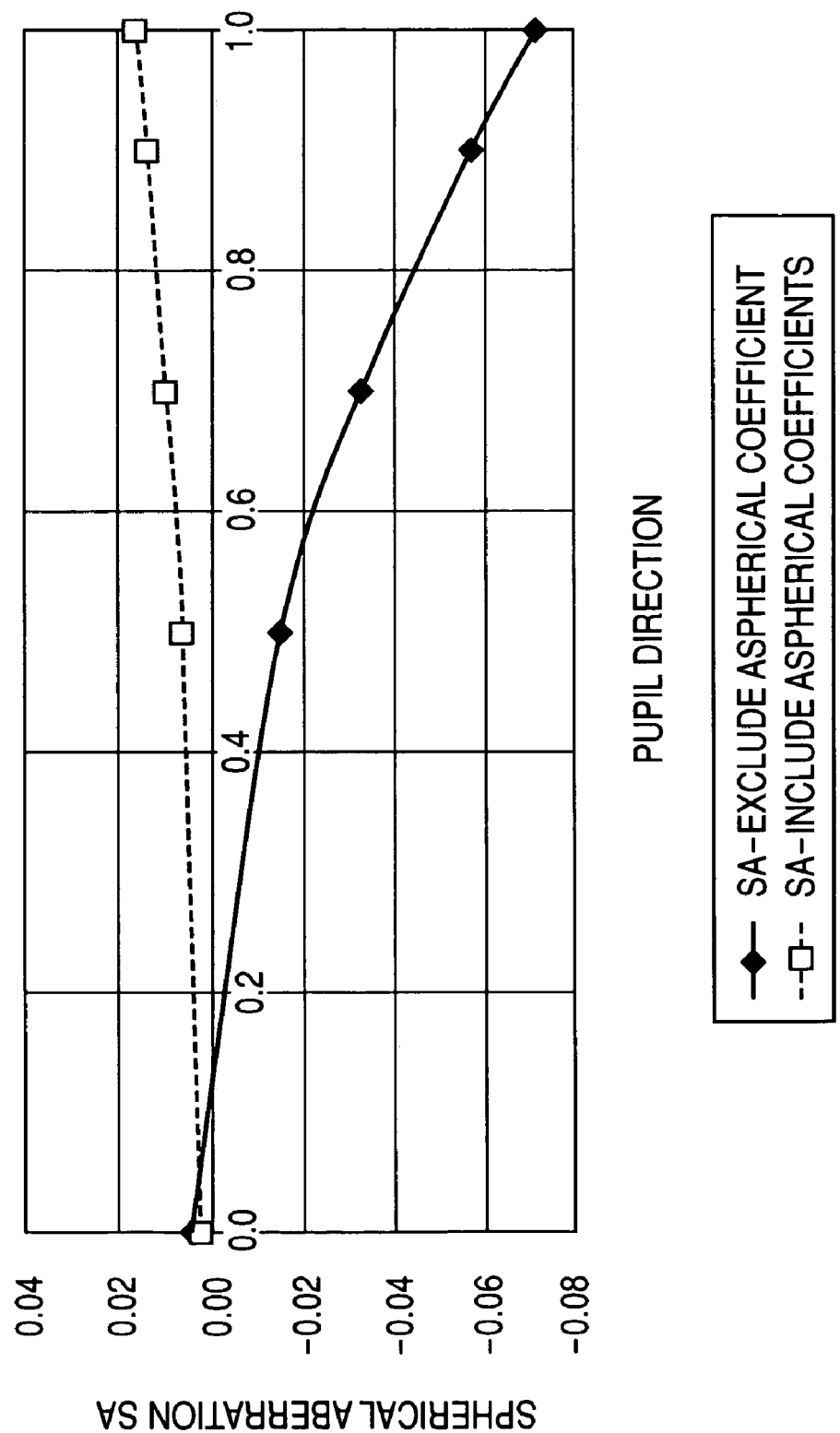
FIG. 5 shows spherical aberration in an incidence optical system of Embodiment 1 of the present invention.

FIG. 5 shows the spherical aberration which is obtained by the inversion trace evaluation applied to the optical system including from the light source means 1 to the optical deflector 5. A broken line in FIG. 5 represents an amount of spherical aberration in Embodiment 1. Further, for comparison with Embodiment 1, a solid line represents a spherical aberration in a case where an aspherical coefficient $B_4$ of the aspherical shape of the incidence surface 41 of the correcting lens 4 is set to zero and the spherical aberration correction effect is removed from Embodiment 1.

As apparent from FIG. 5, in the case of Embodiment 1, a maximum amount of spherical aberration is +0.016. At this time, the left side of the conditional expression (1) becomes 0.68. On the other hand, in the case where the aspherical coefficient, $B_4$, of the aspherical shape of the incidence surface 41 of the correcting lens 4 is set to zero, a maximum amount of spherical aberration is −0.072. At this time, the left side of the conditional expression (1) becomes 2.14.

Thus, for the allowable value, $W_a$=1.79 or $W_a'$=0.94, which is calculated as above, the left side of the conditional expression (1) for which the specifications of Embodiment 1 are substituted is 0.68. Thus, the calculation results fulfill the conditional expression (1).

On the other hand, in the case where the aspherical coefficient $B_4$ of the aspherical shape of the incidence surface 41 of the correcting lens 4 is set to zero, the left side of the conditional expression (1) is 2.14. Hence, it is understood that the calculation results do not satisfy the conditional expression (1).

Next, a description will be given with respect to the conditions under which the focus fluctuation is hard to be caused against the environmental fluctuation.

As a lens material, a refractive index fluctuation in plastic material is equal to or more than two digits larger than that in glass material. For this reason, the focus fluctuation in a case where more optical power is given to the glass lens than to the plastic lens is harder to be caused than in a case where more optical power is given to the plastic lens than to the glass lens. Therefore, an optical power ratio between the condenser lens 2 made of glass material and the correcting lens 4 made of resin material both constituting the incidence optical system 13, the optical power of the condenser lens 2 needs to be increased as much as possible. This relation can be expressed by the following conditional expression (2):

$$|F_1/F_{2p}| < 1 \qquad (2)$$

where $F_1$ represents a focal length (reciprocal of the refractive power) of the first optical system 11 (the condenser lens 2), and $F_{2p}$ represents a focal length of the resin lens (the correcting lens 4) of the second optical system 12 in the main scanning direction.

In the case of Embodiment 1, $F_1/F_{2p}$ is −0.235, and hence the calculation results satisfy the conditional expression (2).

In such a manner, in Embodiment 1, the aspherical surface of the correcting lens 4 compensates for the spherical aberration generated in the condenser lens 2 as described above, whereby the excellent optical performance can be obtained without deteriorating the field curvature on the surface 7 to be scanned.

Note that while one correcting lens 4 having the anamorphic aspherical shape is used in Embodiment 1, the present invention is not intended to be limited thereto, and hence a plurality of correcting lenses may also be used. In addition, while Embodiment 1 adopts the construction shown in FIGS. 1 and 2, the present invention is not intended to be limited thereto. For example, there may also be adopted a construction in which a reflecting member is provided between the light source means 1 and the optical deflector 5, and the light beam to be incident on the optical deflector 5 is made incident on the optical deflector 5 through the reflecting member and is also made incident at a predetermined angle with respect to the normal to the deflecting surface 51 of the optical deflector 5 within the sub-scanning cross section.

In addition, in Embodiment 1, the anamorphic incidence surface of the correction element is made in an aspherical shape in order to compensate for the spherical aberration generated in the condenser lens 2. In addition thereto, however, the high-order coefficient of the diffraction grating of the correction element, e.g., the aspherical coefficient $B_4$ or the like of the phase function, may be optimized to give the correction element the aspherical effect in order to compensate for the spherical aberration generated in the condenser lens 2.

Embodiment 2

Figure 6:
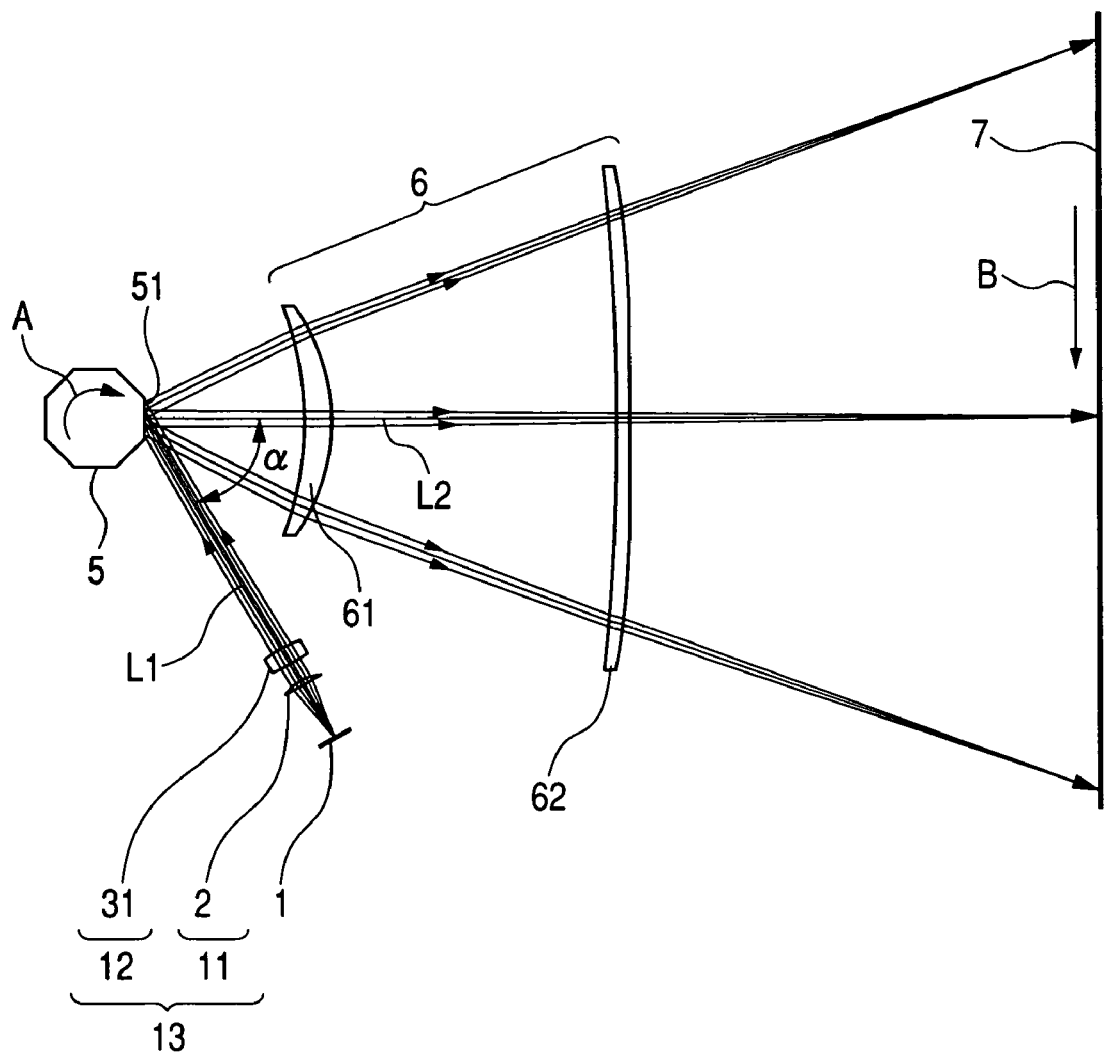
FIG. 6 is a main scanning cross sectional view of Embodiment 2 of the present invention.

FIG. 6 is a cross sectional view (main scanning cross sectional view) of a main portion in the main scanning direction in Embodiment 2 of the present invention. In FIG. 6, the same constituent elements as those shown in FIG. 1 are designated with the same reference numerals.

Embodiment 2 differs from Embodiment 1 in that an angle α between the optical axis L1 of the second optical system 12 and the optical axis L2 of the third optical system 6 within the main scanning cross section has a predetermined angle (α≠0), and that the second optical system 12 is constituted by an anamorphic lens 31. Other constructions and optical operations are nearly the same as those in Embodiment 1, and hence the same effects as those in Embodiment 1 are obtained.

That is, in FIG. 6, reference numeral 12 designates the second optical system including the surface having the beam expanding operation and the aspherical operation for compensating for the aberration. The second optical system 12 includes an anamorphic lens (toric lens) 31, and has optical powers different from each other in the main scanning cross section and in the sub-scanning cross section.

In Embodiment 2, there is adopted a constitution in which the light beam which has been made incident on the optical deflector 5 through the first and second optical systems 11 and 12 exists within the same plane as that of the light beam with which the surface 7 to be scanned is scanned by the third optical system 6 (a so-called intra-deflecting surface scanning optical system). Then, the angle a between the optical axis L2 of the third optical system 6 and the optical axis L1 of the incidence optical system 13 is set to 60° within the main scanning cross section. Note that the set angle α is not limited to 60°.

Next, Tables 3 and 4 show specifications of the optical scanning apparatus in Embodiment 3.

TABLE 3

Angle between Fθ Lens 6 and Incidence Optical System α = 60°

| | Surface | R | D | N |
|---|---|---|---|---|
| Light Source 1 | 1 | | 24.84 | 1.000 |
| Condenser Lens 2 | 2 | ∞ | 2.00 | 1.762 |
| | 3 | −22.11 | 7.80 | 1.000 |

TABLE 3-continued

Angle between Fθ Lens 6 and Incidence Optical System α = 60°

| | Surface | R | D | N |
|---|---|---|---|---|
| Anamorphic Lens 31 | 4 | Table 4 | 7.00 | 1.511 |
| | 5 | ∞ | 5.00 | 1.000 |
| Deflecting/Reflecting Surface 51 | 6 | ∞ | 63.90 | 1.000 |
| Imaging Lens 61 | 7 | Table 4 | 11.00 | 1.524 |
| | 8 | Table 4 | 115.30 | 1.000 |
| Imaging Lens 62 | 9 | Table 4 | 5.00 | 1.524 |
| | 10 | Table 4 | 191.90 | 1.000 |
| Surface 7 to be scanned | 11 | ∞ | | |

TABLE 4

Aspherical Surface Shape

| | | Surface 4 | Surface 7 | Surface 8 | Surface 9 | Surface 10 |
|---|---|---|---|---|---|---|
| Meridian Line Shape | R | 126.1 | −1.38E+02 | −7.38E+01 | −9.46E+02 | −5.97E+03 |
| | K | 0 | 7.80E−01 | −6.38E−01 | 0 | −3.37E+04 |
| | B4 | −1.14E−05 | 3.10E−07 | 1.40E−07 | 0 | −7.50E−08 |
| | B6 | 0 | −1.10E−10 | −3.33E−11 | 0 | 3.37E−12 |
| | B8 | 0 | 1.53E−15 | −2.26E−14 | 0 | −1.06E−16 |
| Sagittal Line Shape | r | 3.90E+01 | −1.00E+03 | −1.00E+03 | 2.20E+03 | −6.49E+01 |
| | d2 | 0 | 0 | 0 | 0 | 2.42E−05 |
| | d4 | 0 | 0 | 0 | 0 | −1.12E−09 |
| | d6 | 0 | 0 | 0 | 0 | 5.28E−14 |
| | d8 | 0 | 0 | 0 | 0 | −4.30E−19 |

$F_1$ = 29.28
F12 = 26.73
F2 = 247
F3 = 313.39
λ = 0.00079

The optical deflector 5 in Embodiment 2, similarly to Embodiment 1 described above, is a polygon mirror having eight surfaces which touch internally to a circle having a radius 18.6 mm, and a width of the deflecting surface 51 in the main scanning direction is 7.12 mm.

In Embodiment 2, the light beam which has been emitted from the light source 1 is converted into a nearly divergent light beam by the condenser lens 2, and the nearly divergent light beam is then converted into a nearly collimated light beam within the main scanning cross section by the anamorphic lens 31, and the nearly collimated light beam is then made incident on the optical deflector 5 with its width in the main scanning direction wider than that of one deflecting surface 51 of the optical deflector 5. On the other hand, the nearly divergent light beam passes through the anamorphic lens 31 within the sub-scanning cross section to be converted into a convergent light beam to form nearly a line image (a longitudinal line image in the main scanning direction) in the vicinity of the deflecting surface 51.

Then, the light beam which has been deflected/reflected by the deflecting surface 51 of the optical deflector 5 is guided to the surface 7 of the photosensitive drum through the first and second imaging lenses 61 and 62. Then, the surface 7 of the photosensitive drum is optically scanned in a direction indicated by an arrow B (main scanning direction) with the light beam by rotating the optical deflector 5 in a direction indicated by an arrow A. Thereby, an image is recorded on the surface 7 of the photosensitive drum as the recording medium.

A surface shape of the anamorphic lens 31 within the main scanning cross section in Embodiment 2 is an aspherical shape, and is configured so as to have the optical characteristics permitting the spherical aberration generated in the condenser lens 2 to be compensated for or to be reduced. Thus, in Embodiment 2, the aspherical surface of the anamorphic lens 31 compensates for the spherical aberration generated in the condenser lens 2 in correspondence to the image height on the surface 7 to be scanned.

Note that the fθ lens system 6 is not necessarily limited to the optical power disposition, the number of lenses used, and the glass material characteristics as shown in Tables 3 and 4. That is, the fθ lens system 6 may adopt a conventional construction which has one or three or more lenses used, different optical power disposition and function expression equation, the known glass material, or the like.

Next, an optical operation of the anamorphic lens 31 for compensating for the spherical aberration generated in the condenser lens 2 will be described with reference to FIG. 7.

Figure 7:
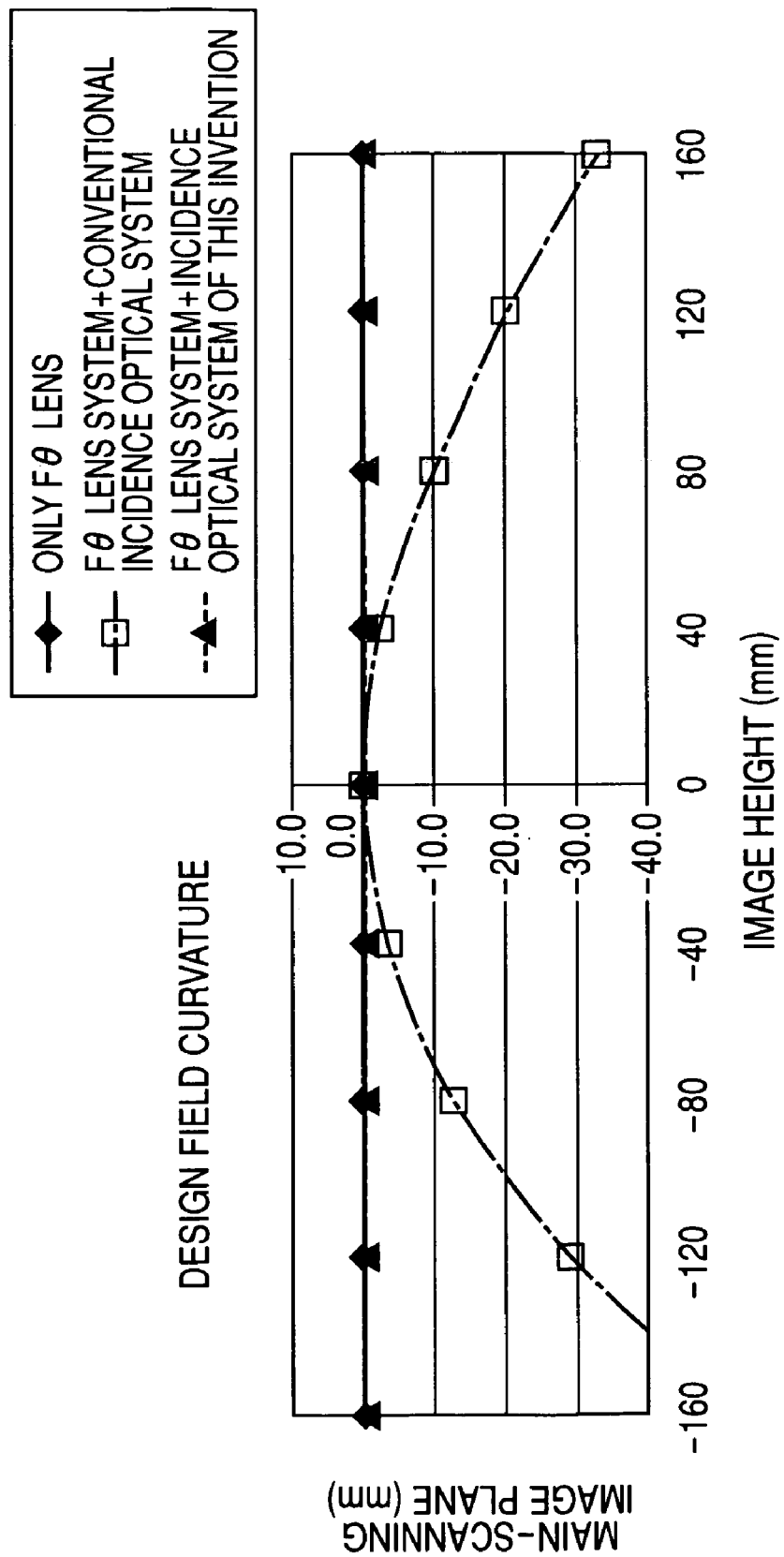
FIG. 7 shows a field curvature in Embodiment 2 of the present invention.

In FIG. 7, data related to image heights on the surface 7 to be scanned is plotted on the axis of abscissa, and data related to image planes in the main scanning direction is plotted on the axis of ordinate. In FIG. 7, of three field curvatures a, b, and c, the field curvature a is a field curvature caused by the fθ lens system 6 including the first and second imaging lenses 61 and 62 shown in FIG. 6. The field curvature b is a field curvature when the fθ lens system 6 is docked with a conventional incidence optical system. Also, the field curvature c is a field curvature when the fθ lens system 6 is docked with the incidence optical system 13 of Embodiment 2, i.e., a field curvature based on the numerical example described in Tables 3 and 4.

Note that the conventional incidence optical system means an optical system which is obtained by removing the aspherical coefficient $B_4$ of the anamorphic lens 31 from the optical system of Embodiment 2 shown in FIG. 6.

When such a conventional incidence optical system is used for the field curvature a of the fθ lens system 6 which is satisfactorily corrected, the whole optical system suffers an influence of the spherical aberration generated in the condenser lens 2. As a result, the field curvature corresponding to the image height is largely caused mainly in the off axis image height, and hence the optical imaging performance on the surface 7 to be scanned is deteriorated.

On the other hand, the field curvature c showing optical performance inherent in Embodiment 2 is equal to the field curvature in the fθ lens system 6. That is, the aspherical surface of the anamorphic lens 31 (second optical system) compensates for the aberration generated in the condenser lens 2 (first optical system) in correspondence to the image height on the surface 7 to be scanned.

In Embodiment 2, similarly to Embodiment 1 described above, when the specifications shown in Tables 3 and 4 are substituted for the conditional expression (1), $W_a=1.79$ or $W_a'=0.94$ is obtained in the right side (allowable value) of the conditional expression (1).

Figure 8:
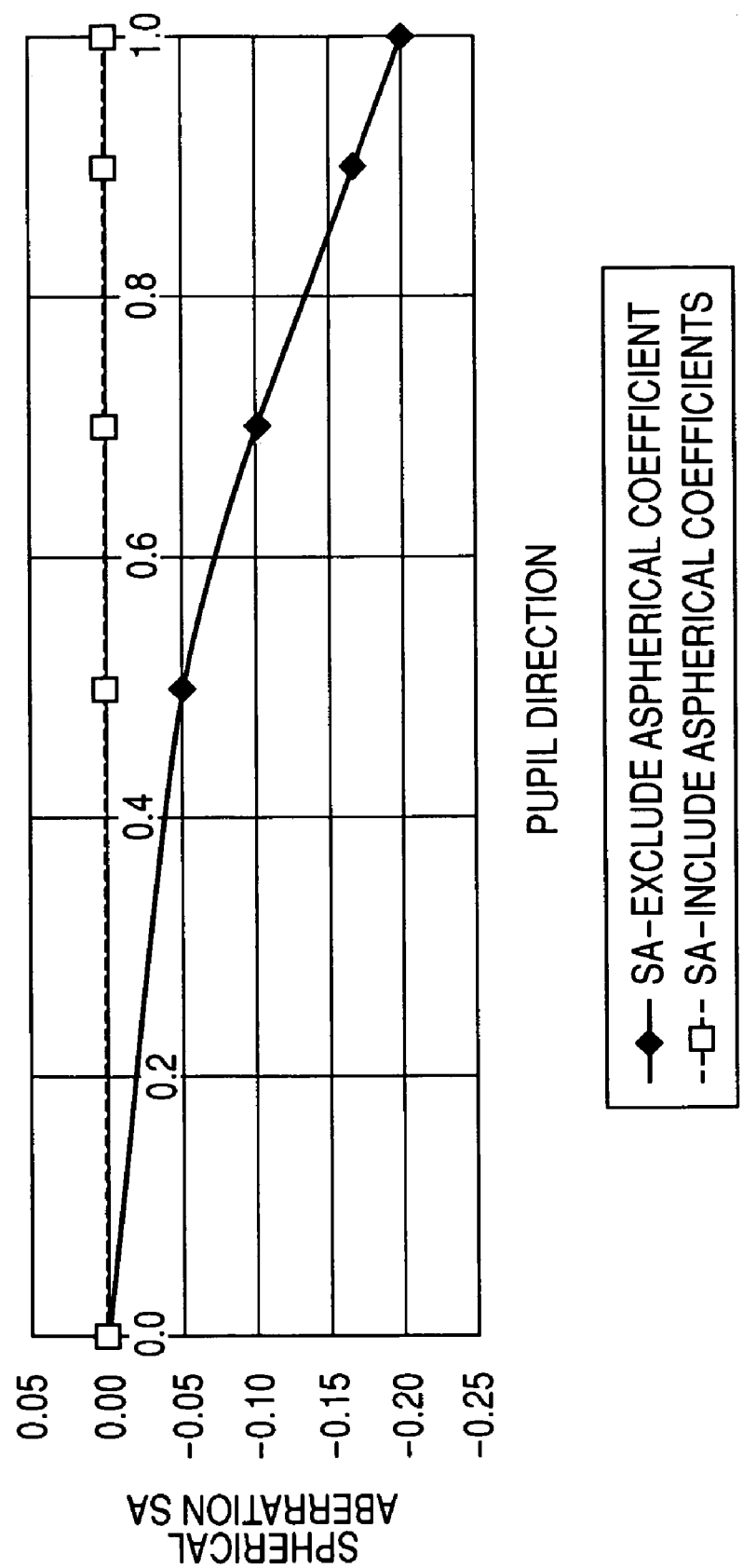
FIG. 8 shows spherical aberration in an incidence optical system of Embodiment 2 of the present invention.

FIG. 8 shows spherical aberration which is obtained by the inversion trace applied to the optical system including from the light source means 1 to the optical deflector 5. In FIG. 8, a broken line represents an amount of spherical aberration in Embodiment 2. Moreover, for comparison with Embodiment 2, a solid line represents a spherical aberration in a case where the aspherical coefficient $B_4$ of the aspherical shape of the anamorphic lens 31 is set to zero and the spherical aberration correction effect is removed from Embodiment 2.

As apparent from FIG. 8, in the case of Embodiment 2, a maximum amount of spherical aberration is +0.0014. At this time, the left side of the conditional expression (1) is 0.58.

On the other hand, in the case where the aspherical coefficient $B_4$ of the aspherical shape of the anamorphic lens 31 is set to zero, a maximum amount of spherical aberration is −0.2007. At this time, the left side of the conditional expression (1) is 82.8.

Thus, for the allowable value, $W_a=1.79$ or $W_a'=0.94$, which is formerly calculated, the left side of the conditional expression (1) for which the specifications of Embodiment 2 are substituted is 0.58. The calculation results satisfy the conditional expression (1).

On the other hand, in the case where the aspherical coefficient $B_4$ of the aspherical shape of the anamorphic lens 31 is set to zero, the left side of the conditional expression (1) is 82.8. Thus, it is understood that the calculation results do not satisfy the conditional expression (1).

In addition, it is understood from Tables 3 and 4 that a curvature in the main scanning direction of the incidence surface of the anamorphic lens 31 is smaller than that in the sub-scanning direction, and hence the optical power in the main scanning direction is smaller than that in the sub-scanning direction.

Embodiment 3

Figure 9:
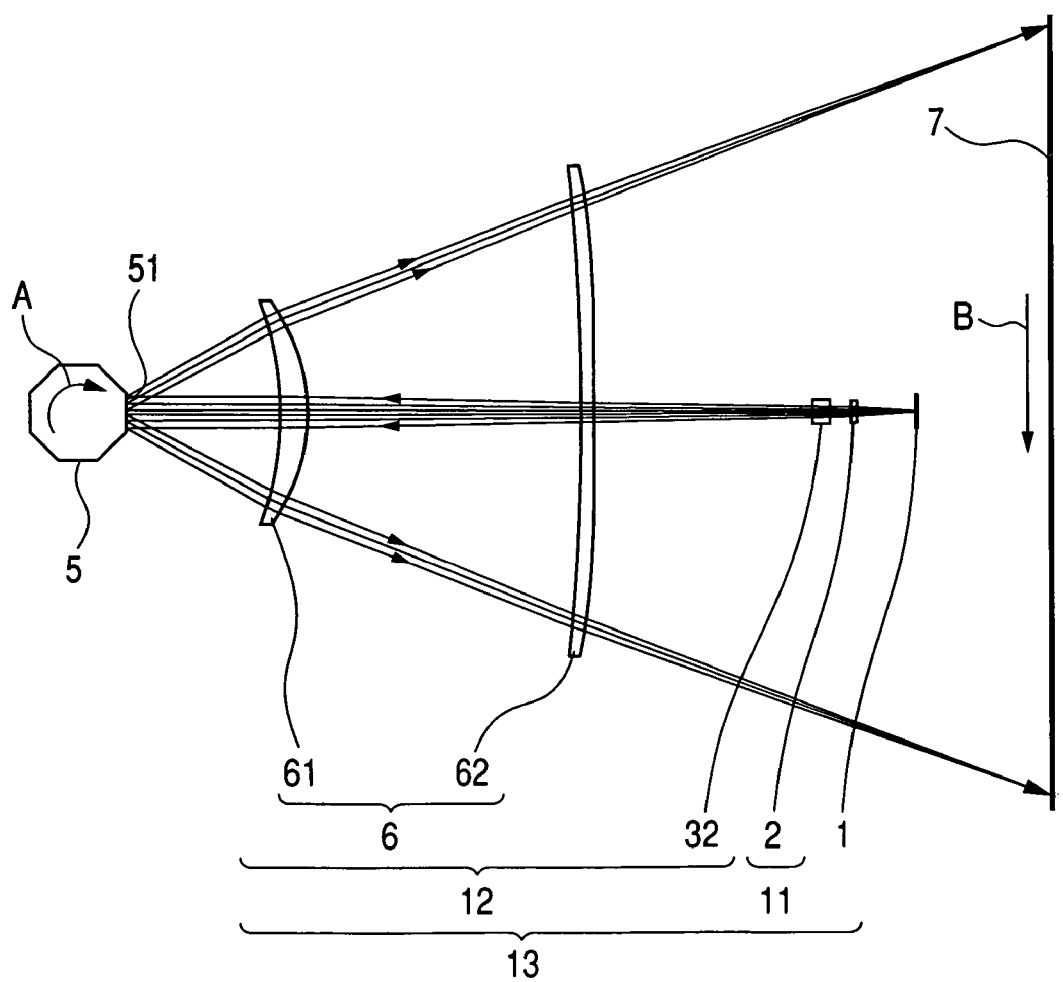
FIG. 9 is a main scanning cross sectional view of Embodiment 3 of the present invention.

FIG. 9 is a cross sectional view (main scanning cross sectional view) of a main portion in the main scanning direction in Embodiment 3 of the present invention. In FIG. 9, the same constituent elements as those shown in FIG. 1 are designated with the same reference numerals.

Embodiment 3 differs from Embodiment 1 in that the second optical system 12 is constituted by an anamorphic lens 32, and a first imaging lens 61 constituting a part of the third optical system 6. Other constructions and optical operations are nearly the same as those of Embodiment 1, and hence the same effects as those in Embodiment 1 are obtained.

That is, in FIG. 9, reference numeral 12 designates the second optical system including a surface having the beam expanding operation and the aspherical operation for compensating for the aberration. The second optical system 12 includes an anamorphic lens 32 having optical powers different from each other in the main scanning cross section and in the sub-scanning cross section, and a first imaging lens 61 constituting a part of the third optical system 6.

In Embodiment 3, similarly to Embodiment 1 described above, the light beam is made obliquely incident on the deflecting surface 51 of the polygon mirror 5 at a predetermined angle, $\theta=3°$, with respect to a normal to the deflecting surface 51 within the sub-scanning cross section (oblique incidence optical system). In addition, similarly to Embodiment 1, there is adopted the double path along which the incident light beam made incident on the optical deflector 5 at a predetermined angle within the sub-scanning cross section and the deflected light beam deflected by the optical deflector 5 are made pass through the first imaging lens 61 as a part of the fθ lens system 6.

Next, Tables 5 and 6 show specifications of the optical scanning apparatus in Embodiment 3 of the present invention

TABLE 5

Oblique Incidence Angle within Sub-scanning Cross Section $\theta = 3°$.

|  | Surface | R | D | N |
|---|---|---|---|---|
| Light Source 1 | 1 |  | 21.84 | 1.000 |
| Condenser Lens 2 | 2 | ∞ | 2.00 | 1.762 |
|  | 3 | −26.71 | 10.00 | 1.000 |
| Anamorphic Lens 32 | 4 | Table 6 | 7.00 | 1.524 |
|  | 5 | ∞ | 214.00 | 1.000 |
| Imaging Lens 61 | 6 | Inversion Shape of Surface 12 | 11.00 | 1.524 |
|  | 7 | Inversion Shape of Surface 11 | 63.90 | 1.000 |
| Deflecting/Reflecting Surface 51 | 8 | ∞ | 63.90 | 1.000 |
| Imaging Lens 61 | 9 | Table 6 | 11.00 | 1.524 |
|  | 10 | Table 6 | 115.30 | 1.000 |
| Imaging Lens 62 | 11 | Table 6 | 5.00 | 1.524 |
|  | 12 | Table 6 | 191.90 | 1.000 |
| Surface 7 to be scanned | 13 | ∞ |  |  |

TABLE 6

Aspherical Surface Shape

|  |  | Surface 4 | Surface 9 | Surface 10 | Surface 11 | Surface 12 |
|---|---|---|---|---|---|---|
| Meridian Line Shape | R | ∞ | −1.38E+02 | −7.38E+01 | −9.36E+02 | −5.64E+03 |
|  | K | 0 | 7.80E−01 | −6.38E−01 | 0 | −3.37E+04 |
|  | B4 | −5.80E−05 | 3.10E−07 | 1.40E−07 | 0 | −7.73E−08 |
|  | B6 | 0 | −1.10E−10 | −3.33E−11 | 0 | 3.87E−12 |
|  | B8 | 0 | 1.53E−15 | −2.26E−14 | 0 | −1.06E−16 |
|  | B10 | 0 | 0 | 0 | 0 | 1.88E−21 |

TABLE 6-continued

Aspherical Surface Shape

|  |  | Surface 4 | Surface 9 | Surface 10 | Surface 11 | Surface 12 |
|---|---|---|---|---|---|---|
| Sagittal Line Shape | r | 3.16E+01 | −1.47E+03 | −1.47E+03 | 2.20E+02 | −6.47E+01 |
|  | d2 | 0 | 0 | 0 | 0 | 2.44E−05 |
|  | d4 | 0 | 0 | 0 | 0 | −1.23E−09 |
|  | d6 | 0 | 0 | 0 | 0 | 7.29E−14 |
|  | d8 | 0 | 0 | 0 | 0 | −4.30E−19 |
|  | d10 | 0 | 0 | 0 | 0 | −1.21E−22 |

$F_1 = 35.07$
$F12 = 99.458$
$F2 = \infty$
$F3 = 313.40$
$\lambda = 0.00079$

In Embodiment 3, the optical deflector 5, similarly to Embodiment 1 described above, is a polygon mirror having eight surfaces which touch internally to a circle having radius 18.6 mm, and a width in the main scanning direction of the deflecting surface 51 is 7.12 mm.

The light beam emitted from the light source means 1 in Embodiment 3 is converted into a nearly divergent light beam by the condenser lens 2, the nearly divergent light beam is then converted into a nearly collimated light beam within the main scanning cross section by the anamorphic lens 32 and the first imaging lens 61, and the nearly collimated light beam is then made incident on the optical deflector 5 with its width in the main scanning cross section wider than that of one deflecting surface 51 of the optical deflector 5. On the other hand, the nearly divergent light beam passes through the anamorphic lens 32 to be converted into a convergent light beam within the sub-scanning cross section to form nearly a line image (a longitudinal line image in the main-scanning direction) in the vicinity of the deflecting surface 51.

Then, the light beam which has been deflected/reflected by the deflecting surface 51 of the optical deflector 5 is guided to the surface 7 of the photosensitive drum through the first and second imaging lenses 61 and 62. The surface 7 of the photosensitive drum is optically scanned in a direction indicated by an arrow B (main scanning direction) with the light beam by rotating the optical deflector 5 in a direction indicated by an arrow A. Thereby, an image is recorded on the surface 7 of the photosensitive drum as the recording medium.

A surface shape of the anamorphic lens 31 in Embodiment 3 within the main scanning cross section is an aspherical shape, and is determined so as to have the optical characteristics permitting the spherical aberration generated in the condenser lens 2 to be compensated for or to be reduced. Thus, in Embodiment 3, the aspherical surface of the anamorphic lens 32 compensates for the spherical aberration generated in the condenser lens 2 in correspondence to the image height on the surface 7 to be scanned.

Note that the fθ lens system 6 is not necessarily limited to the power disposition, the number of lenses used, and the glass material characteristics as shown in Tables 5 and 6. That is, the fθ lens system 6 may adopt a known configuration that has one or three or more lenses, different optical power disposition, function expression equation, the glass material, or the like.

Next, an optical operation of the anamorphic lens 32 for compensating for the spherical aberration generated in the condenser lens 2 will be described with reference to FIG. 10.

Figure 10:
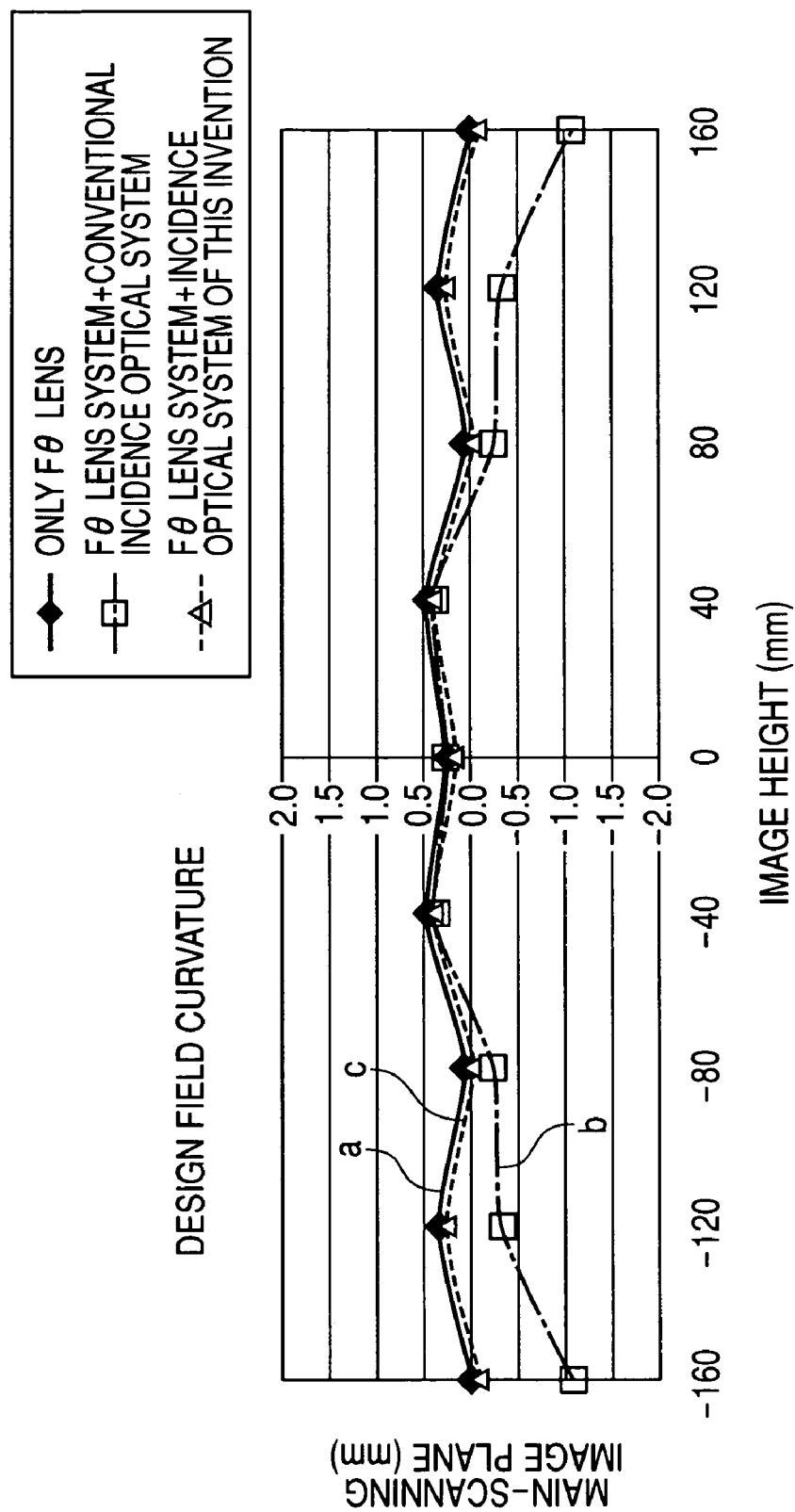
FIG. 10 shows a field curvature in Embodiment 3 of the present invention.

In FIG. 10, data related to image heights on the surface 7 to be scanned is plotted on the axis of abscissa, and data related to image planes in the main scanning direction is plotted on the axis of ordinate. In FIG. 10, of three field curvatures a, b, and c, the field curvature a is a field curvature caused by the fθ lens system 6 including the first and second lenses 61 and 62 shown in FIG. 9. The field curvature b is a field curvature when the fθ lens system 6 is docked with a conventional incidence optical system. Also, the field curvature c is a field curvature when the fθ lens system 6 is docked with the incidence optical system 13 of Embodiment 2, i.e., a field curvature based on the numerical example described in Tables 5 and 6.

Note that the conventional incidence optical system means an optical system which is obtained by removing the aspherical coefficient $B_4$ of the anamorphic lens 32 from the optical system of Embodiment 3 shown in FIG. 9.

When such a conventional incidence optical system is used for the field curvature a of the fθ lens system 6 which is satisfactorily corrected, the whole optical system suffers an influence of the spherical aberration generated in the condenser lens 2. As a result, the field curvature corresponding to the image height is largely caused mainly in the off axis image height, and hence the optical imaging performance on the surface 7 to be scanned is deteriorated.

On the other hand, the field curvature c showing the optical performance inherent in Embodiment 3 is equal to the field curvature in the fθ lens system 6. That is, the aspherical surface of the anamorphic lens 32 (second optical system) compensates for the aberration which is generated in the condenser lens 2 (first optical system) in correspondence to the image height on the surface 7 to be scanned.

In Embodiment 3, similarly to Embodiments 1 and 2 described above, when the specifications shown in Tables 5 and 6 are substituted for the conditional expression (1), $W_a=1.79$ or $W_a'=0.94$ is obtained in the right side (allowable value) of the conditional expression (1).

Figure 11:
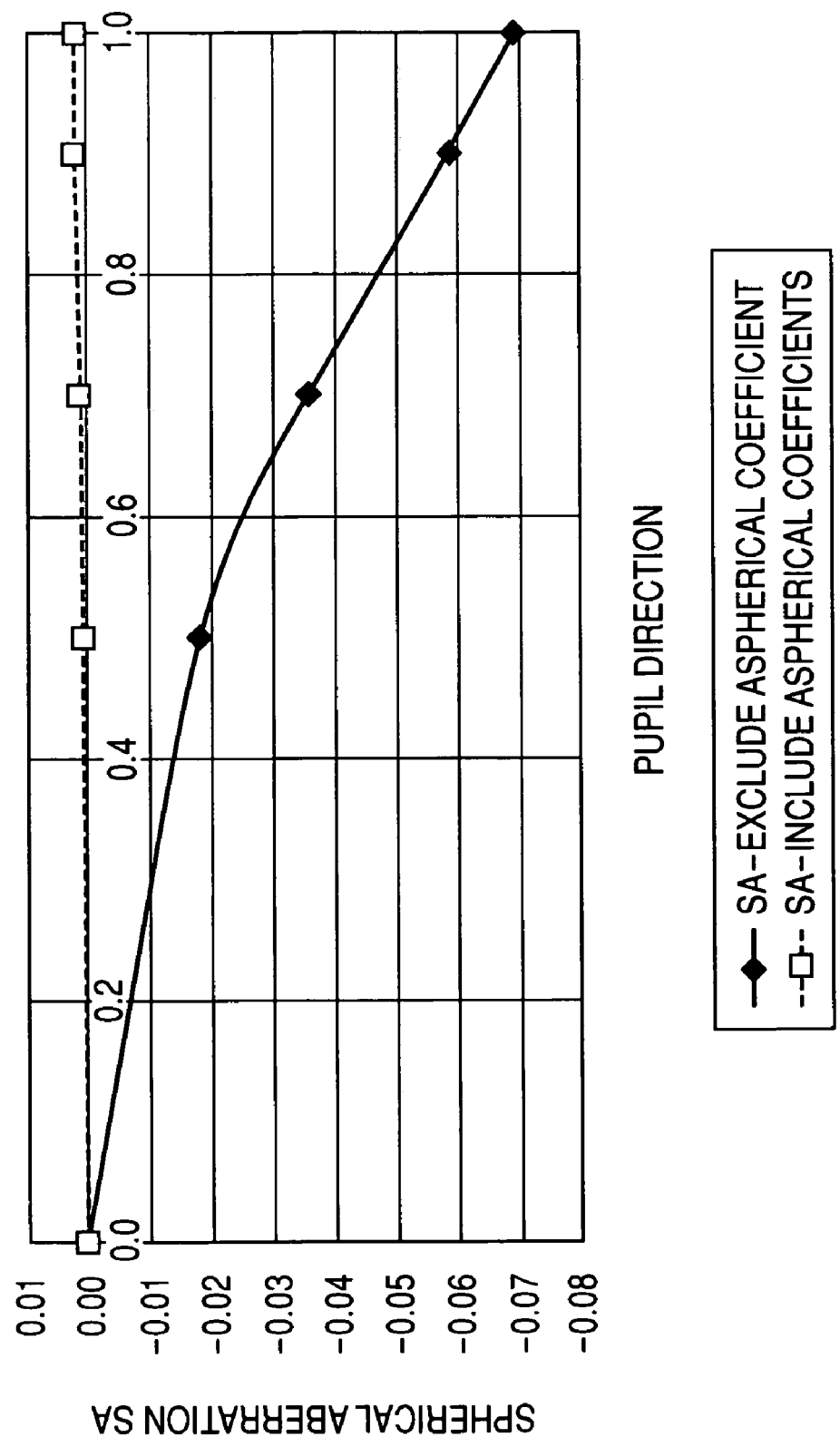
FIG. 11 shows spherical aberration in an incidence optical system of Embodiment 3 of the present invention.

FIG. 11 shows spherical aberration which is obtained by the inversion trace evaluation applied to the optical system including from the light source means 1 to the optical deflector 5. In FIG. 11, a broken line represents an amount of spherical aberration in Embodiment 3. Moreover, for comparison with Embodiment 3, a solid line represents spherical aberration in a case where the aspherical coefficient $B_4$ of the aspherical shape of the anamorphic lens 31 is set to zero, and the spherical aberration correction effect is removed from Embodiment 3.

As apparent from FIG. 11, in the case of Embodiment 3, a maximum amount of spherical aberration is +0.0023. At this time, the left side of the conditional expression (1) is 0.07.

On the other hand, in the case where the aspherical coefficient $B_4$ of the aspherical shape of the anamorphic lens 31 is set to zero, a maximum amount of spherical aberration is −0.0694. At this time, the left side of the conditional expression (1) is 2.07.

Thus, for the allowable value, $W_a=1.79$ or $W_a'=0.94$, which is calculated as above, the left side of the conditional expression (1) for which the specifications of Embodiment 2 are substituted is 0.07. The calculation results satisfy the conditional expression (1).

On the other hand, in the case where the aspherical coefficient $B_4$ of the aspherical shape of the anamorphic lens 31 is set to zero, the left side of the conditional expression (1) is 2.07. Thus, it is understood that the calculation results do not satisfy the conditional expression (1).

In addition, it is understood from Tables 5 and 6 that a curvature in the main scanning direction of the incidence surface of the anamorphic lens 32 is smaller than that in the sub-scanning direction, and hence the optical power in the main scanning direction is smaller than that in the sub-scanning direction.

(Image Forming Apparatus)

Figure 12:
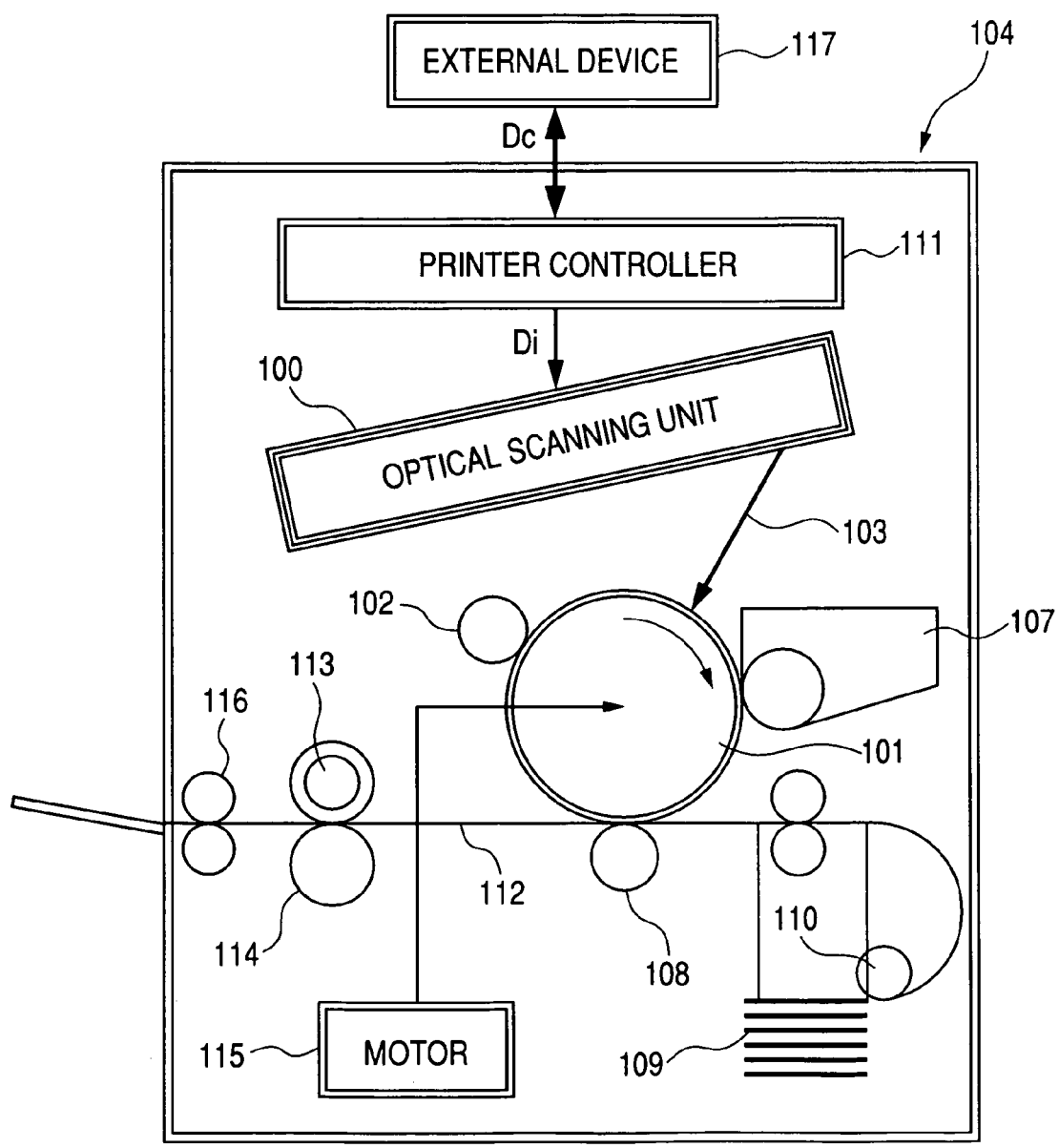
FIG. 12 is a sub-scanning cross sectional view showing Embodiment of an image forming apparatus of the present invention.

FIG. 12 is a cross sectional view showing a main portion in the sub-scanning direction in Embodiment of an image firming apparatus of the present invention. In FIG. 12, reference numeral 104 designates the image forming apparatus. Code data $D_c$ is inputted from an external device 117 such as a personal computer to the image forming apparatus 104. The code data $D_c$ is converted into image data (dot data) $D_i$ by a printer controller 111 provided within the image forming apparatus 104. The code data $D_i$ is inputted to an optical scanning unit 100 having the construction described in any one of Embodiments 1 to 3. Then, a light beam 103 which has been modulated in correspondence to the image data $D_i$ is emitted from the optical scanning unit 100, and a photosensitive surface of a photosensitive drum 101 is scanned in the main scanning direction with the light beam 103.

The photosensitive drum 101 serving as an electrostatic latent image bearing member (photosensitive member) is rotated clockwise by a motor 115. The photosensitive surface of the photosensitive drum 101 moves in the sub-scanning direction orthogonal to the main scanning direction with respect to the light beam 103 along with the rotation of the photosensitive drum 101. A charging roller 102 for charging uniformly the surface of the photosensitive drum 101 with electricity is provided above the photosensitive drum 101 so as to abut against the surface of the photosensitive drum 101. Then, the light beam 103 with which the surface of the photosensitive drum 101 is to be scanned by the optical scanning unit 100 is applied to the surface of the photosensitive drum 101 which is charged with electricity by the charging roller 102.

As described above, the light beam 103 is modulated based on the image data $D_i$. An electrostatic latent image is formed on the surface of the photosensitive drum 101 by applying the light beam 103 to the surface of the photosensitive drum 101. The electrostatic latent image is developed in the form of a toner image by a developing device 107 which is disposed on a more downstream side in the rotation direction of the photosensitive drum 101 with respect to the irradiation position of the light beam 103 so as to abut against the surface of the photosensitive drum 101.

The toner image which has been obtained through the developing process in the developing device 107 is transferred onto a sheet 112 as a transfer target material by a transferring roller 108 which is disposed below the photosensitive drum 101 so as to face the surface of the photosensitive drum 101. While the sheets 112 are accommodated in a sheet cassette 109 which is disposed in front of the photosensitive drum 101 (on a right-hand side in FIG. 12), the sheet may also be fed by manual feed. A sheet feeding roller 110 is disposed in an end portion of the sheet cassette 109, and serves to send the sheets 112 accommodated within the sheet cassette 109 one by one to a conveyance path.

The sheet 112 onto which the unfixed toner image has been transferred in a manner as described above is further conveyed to a fixing device which is disposed in the rear of the photosensitive drum 101 (on a left-hand side in FIG. 12). The fixing device includes a fixing roller 113 having a fixing heater (not shown) provided therein, and a pressurizing roller 114 which is disposed so as to be pressed against the fixing roller 113. The fixing device serves to heat the sheet 112 conveyed thereto from the transferring portion while pressing the sheet 112 in a pressing portion between the fixing roller 113 and the pressurizing roller 114, thereby fixing the unfixed toner image on the sheet 112. Moreover, a sheet discharging roller 116 is disposed in the rear of the fixing roller 113 and serves to discharge the sheet 112 having therein the fixed toner image to the outside of the image forming apparatus 104.

While not illustrated in FIG. 12, the printer controller 111 carries out not only the conversion of the data which is previously described, but also the control for portions, such as the motor, within the image forming apparatus, and a polygon motor and the like within an optical scanning unit which will be described later.

(Color Image Forming Apparatus)

Figure 13:
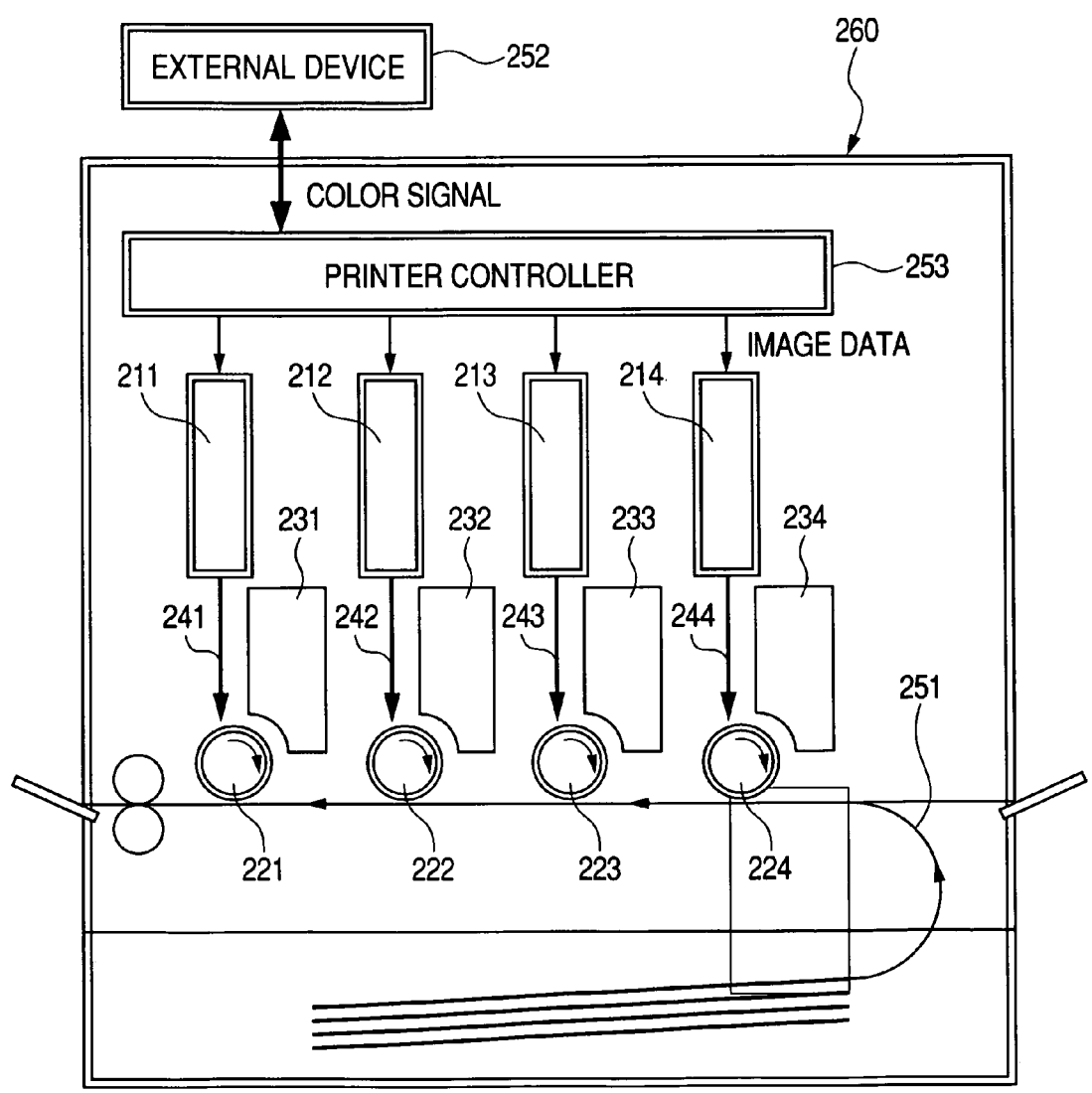
FIG. 13 is a schematic view showing a main portion of a color image forming apparatus of Embodiment of the present invention.

FIG. 13 is a schematic view showing a main portion of a color image forming apparatus according to Embodiment of the present invention. Embodiment relates to a tandem type color image forming apparatus for recording image information on surfaces of photosensitive drums as image bearing members in a parallel manner using four optical scanning apparatuses which are disposed so as to correspond to the respective photosensitive drums. In FIG. 13, reference numeral 260 designates the color image forming apparatus, reference numerals 211, 212, 213 and 214 designate optical scanning apparatuses, respectively, each having the construction described in any one of Embodiments 1 to 3, reference numerals 221, 222, 223 and 224 designate the photosensitive drums as image bearing members, respectively, reference numerals 231, 232, 233 and 234 designate developing devices, respectively, and reference numeral 251 designates a conveyance belt.

In FIG. 13, color signals corresponding to R (red), G (green), and B (blue) are inputted from an external device 252 such as a personal computer to the color image forming apparatus 260. Those color signals are converted into image data (dot data) corresponding to C (cyan), M (magenta), Y (yellow) and B (black) by a printer controller 253 provided within the color image forming apparatus 260, respectively. The image data is inputted to the optical scanning apparatuses 211, 212, 213 and 214, respectively. Then, light beams 241, 242, 243 and 244, which have been modulated in correspondence to the respective image data, are emitted from the optical scanning apparatuses 211, 212, 213 and 214, respectively. Photosensitive surfaces of the photosensitive drums 221, 222, 223 and 224 are scanned in the main scanning direction with those light beams 241, 242, 243 and 244, respectively.

The color image forming apparatus in Embodiment serves to record image signals (image information) on the surfaces of the photosensitive drums 221, 222, 223 and 224 in a parallel manner using the four optical scanning apparatuses 211, 212, 213 and 214 corresponding to C (cyan), M (magenta), Y (yellow) and B (black), respectively, to print a color image at a high speed.

In the color image forming apparatus in this Embodiment, as described above, latent images corresponding to the four colors are formed on the surfaces of the corresponding photosensitive drums 221, 222, 223 and 224, respectively, using the light beams 241, 242, 243 and 244 based on the image data by the four optical scanning apparatuses 211, 212, 213 and 214, respectively. Thereafter, the latent images are multiply transferred onto one sheet of recording material to form a full-color image on the recording material.

A color image reading device including a CCD sensor for example may be used as the external device 252. In this case, a color digital copying machine is constituted by this color image reading device, and the color image forming apparatus 260.

This application claims priority from Japanese Patent Application No. 2004-047906 filed Feb. 24, 2004, which is hereby incorporated by reference herein.

What is claimed is:

1. An optical scanning apparatus, comprising:
   light source means;
   a first optical system for converting a divergent light beam emitted from the light source means;
   a second optical system for guiding the light beam converted in the first optical system to an optical deflector; and
   a third optical system for guiding the light beam deflected by the optical deflector to a surface to be scanned,
   wherein the first optical system and the second optical system convert the light beam emitted from the light source means into a collimated light beam or a nearly collimated light beam within a main scanning cross-section to make a width of the light beam wider than that of the deflecting surface in a main scanning direction to make the light beam incident on a deflecting surface of the optical deflector, and
   wherein an optical surface which is included in the second optical system and which has an aspherical operation within the main scanning cross-section compensates for spherical aberration generated in the first optical system.

2. An optical scanning apparatus, comprising:
   light source means;
   a first optical system for converting a divergent light beam emitted from the light source means;
   a second optical system for guiding the light beam converted in the first optical system to an optical deflector; and
   a third optical system for guiding the light beam deflected by the optical deflector to a surface to be scanned,
   wherein at least a part of the second optical system includes the third optical system,
   wherein the first optical system and the second optical system convert the light beam emitted from the light source means into a collimated light beam or a nearly collimated light beam within a main scanning cross-section to make a width of the resultant light beam wider than that of the deflecting surface in a main scanning direction to make the light beam incident on a deflecting surface of the optical deflector,
   wherein an optical axis of the second optical system and an optical axis of the third optical system are aligned with each other within the main scanning cross-section,
   wherein the first optical system and the second optical system make the light beam emitted from the light source means incident on the deflecting surface of the optical deflector at a predetermined angle with respect to a normal to the deflecting surface within a sub-scanning cross-section, and
   wherein an optical surface which is included in the second optical system and which has an aspherical operation within the main scanning cross-section compensates for spherical aberration generated in the first optical system.

3. An optical scanning apparatus according to claim 1, wherein an angle between an optical axis of the second optical system and an optical axis of the third optical system within the main scanning cross-section is a predetermined angle.

4. An optical scanning apparatus according to claim 2, wherein the first optical system comprises a single spherical lens.

5. An optical scanning apparatus according to claim 2, wherein the optical surface which is included in the second optical system and which has the aspherical operation within the main scanning cross-section compensates for a field curvature on the surface to be scanned in the main scanning direction due to spherical aberration generated in the first optical system.

6. An optical scanning apparatus according to claim 2, wherein the optical surface which is included in the second optical system and which has the aspherical operation within the main scanning cross-section has a non-arcuate shape.

7. An optical scanning apparatus according to claim 2, wherein the optical surface which is included in the second optical system and which has the aspherical operation within the main scanning cross-section comprises a diffracting surface.

8. An optical scanning apparatus according to claim 7, wherein the diffracting surface compensates for chromatic aberration, in the whole system including the first optical system, the second optical system, and the third optical system, which is generated when a wavelength of the light beam emitted from the light source means fluctuates, and/or chromatic aberration which is generated in the whole system including the first optical system, the second optical system, and the third optical system.

9. An optical scanning apparatus according to claim 2, wherein a reflecting member is provided between the light source means and the optical deflector, and the light beam to be made incident on the optical deflector is made incident on the optical deflector through the reflecting member, and is also made incident on the deflecting surface of the optical deflector at a predetermined angle with respect to the normal to the deflecting surface.

10. An optical scanning apparatus according to claim 3, wherein the light beam made incident on the optical deflector through the first optical system and the second optical system exists within the same plane as that of the light beam with which the surface to be scanned is scanned by the third optical system.

11. An optical scanning apparatus according to claim 2,
wherein the first optical system comprises a lens made of glass material, and the second optical system comprises at least one lens made of resin, and wherein, letting SA be maximum spherical aberration generated in the first optical system and the second optical system, $F_{12}$ be a composite focal length of the first optical system and the second optical system in the main scanning direction, $F_3$ be a focal length of the third optical system in the main scanning direction, $\lambda$ be a wavelength of the light beam emitted from the light source means, and W be a width of the deflecting surface of the optical deflector in the main scanning direction, a following condition is satisfied:

$$3.0 \times |SA| \times (F_3/F_{12})^2 \leq 1.55 \times 10^3 \times (F_3/W \times \lambda)^2.$$

12. An image forming apparatus, comprising:

the optical scanning apparatus according to claim 1 or 2;

a photosensitive member disposed on the surface to be scanned;

a developing device for developing, as a toner image, an electrostatic latent image formed on the photosensitive member using a light beam with which the photosensitive member is scanned by the optical scanning apparatus;

a transferring device for transferring the toner image obtained through the developing process onto a transfer target material; and a fixing device for fixing the transferred toner image to the material to be transferred.

13. An image forming apparatus, comprising:

the optical scanning apparatus according to claim 1 or 2; and a printer controller for converting code data inputted thereto from an external device into an image signal to input the image signal to the optical scanning apparatus.

14. A color image forming apparatus comprising a plurality of image bearing members for forming images having colors different from each other, each of the plurality of image bearing members being disposed on the surface to be scanned of the optical scanning apparatus according to claim 1 or 2.

15. A color image forming apparatus according to claim 14, further comprising a printer controller for converting color signals inputted thereto from an external device into image data corresponding to the different colors, respectively, to input the image data to the optical scanning apparatuses, respectively.

* * * * *